(12) United States Patent
Fukuda

(10) Patent No.: US 10,065,634 B2
(45) Date of Patent: Sep. 4, 2018

(54) ENERGY MANAGEMENT CONTROL DEVICE FOR HYBRID VEHICLE

(71) Applicant: Nissan Motor Co., Ltd., Yokohama-shi, Kanagawa (JP)

(72) Inventor: Hiroyuki Fukuda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/580,719

(22) PCT Filed: Jun. 10, 2015

(86) PCT No.: PCT/JP2015/066746
§ 371 (c)(1),
(2) Date: Dec. 8, 2017

(87) PCT Pub. No.: WO2016/199247
PCT Pub. Date: Dec. 15, 2016

(65) Prior Publication Data
US 2018/0093659 A1 Apr. 5, 2018

(51) Int. Cl.
*B60L 9/00* (2006.01)
*B60W 20/20* (2016.01)
(Continued)

(52) U.S. Cl.
CPC ............ *B60W 20/20* (2013.01); *B60K 6/387* (2013.01); *B60K 6/442* (2013.01); *B60K 6/547* (2013.01);
(Continued)

(58) Field of Classification Search
CPC .. B60W 20/20; B60W 20/13; B60W 2510/24; B60K 6/387; B60K 6/442;
(Continued)

(56) References Cited

U.S. PATENT DOCUMENTS

| 6,053,842 A | 4/2000 | Kitada et al. |
| 8,170,737 B2 * | 5/2012 | Tate, Jr. ................ B60W 10/06 701/22 |

(Continued)

FOREIGN PATENT DOCUMENTS

| JP | 2000-156910 A | 6/2000 |
| JP | 2000-224712 A | 8/2000 |

(Continued)

*Primary Examiner* — Hussein Elchanti
(74) *Attorney, Agent, or Firm* — Global IP Counselors, LLP

(57) ABSTRACT

An energy management control device for a hybrid vehicle has an energy management controller that suppresses an occurrence of a condition in which an EV start is not possible due to insufficient battery charge capacity when an engagement clutch fails. When the energy management controller has determined that one of the engagement clutches has failed that is used to carry out an EV start using a first motor generator as a drive source that receives electrical power from a high-power battery when starting the vehicle, energy management maps are used in energy management control, which have a usage SOC range that is broader than the usage SOC range of the normal energy management map, which is used during normal operation.

14 Claims, 12 Drawing Sheets

(51) Int. Cl.
*B60K 6/547* (2007.10)
*B60K 6/387* (2007.10)
*B60K 6/442* (2007.10)
*B60W 20/13* (2016.01)

(52) U.S. Cl.
CPC ....... *B60W 20/13* (2016.01); *B60W 2510/244* (2013.01); *B60Y 2200/92* (2013.01); *B60Y 2300/182* (2013.01); *Y10S 903/914* (2013.01); *Y10S 903/919* (2013.01); *Y10S 903/93* (2013.01)

(58) Field of Classification Search
CPC ................ B60K 6/547; B60Y 2200/92; B60Y 2300/182; Y10S 903/914; Y10S 903/919; Y10S 903/93
See application file for complete search history.

(56) References Cited

U.S. PATENT DOCUMENTS

| | | | | |
|---|---|---|---|---|
| 8,229,613 | B2* | 7/2012 | Kato | B60K 6/48 701/22 |
| 10,000,205 | B2* | 6/2018 | Koshiba | B60L 11/1861 |
| 2009/0150016 | A1* | 6/2009 | Hung | B60K 6/48 701/22 |
| 2011/0022255 | A1* | 1/2011 | Yamada | B60K 6/46 701/22 |
| 2011/0066310 | A1* | 3/2011 | Sakai | B60L 1/00 701/22 |
| 2012/0010767 | A1* | 1/2012 | Phillips | G01C 21/3469 701/22 |
| 2012/0010768 | A1* | 1/2012 | Phillips | B60L 11/123 701/22 |
| 2012/0209462 | A1* | 8/2012 | Roos | B60W 10/06 701/22 |
| 2013/0186233 | A1 | 7/2013 | Kaltenbach | |
| 2013/0225361 | A1* | 8/2013 | Gupta | B60W 10/105 477/3 |
| 2016/0176395 | A1* | 6/2016 | Hata | B60W 20/40 701/22 |
| 2016/0193938 | A1* | 7/2016 | Hata | B60K 6/387 701/22 |
| 2017/0050635 | A1* | 2/2017 | Kitahata | B60K 6/26 |

FOREIGN PATENT DOCUMENTS

| | | |
|---|---|---|
| JP | 2009-202662 A | 9/2009 |
| JP | 2010-221745 A | 10/2010 |
| JP | 2014-101065 A | 6/2014 |

* cited by examiner

ENGAGEMENT TABLE

| C2 | C3 | C1 Left | C1 N | C1 Right |
|---|---|---|---|---|
| N | N | EV – ICEgen | Neutral | EV – ICE 3rd |
| N | Left | EV 1st ICE 1st | EV 1st ICE – | EV 1st ICE 3rd |
| N | Left | Lock | EV 1st ICE 2nd | Lock |
| Left | N | EV 1.5 ICE 2nd | EV – ICE 2nd | Lock |
| Left | Right | Lock | EV 2nd ICE 2nd | Lock |
| N | Right | EV 2nd ICE 3rd' | EV 2nd ICE – | EV 2nd ICE 3rd |
| Right | Right | Lock | EV 2nd ICE 4th | Lock |
| Right | N | EV 2.5 ICE 4th | EV – ICE 4th | Lock |
| Right | Left | Lock | EV 1st ICE 4th | Lock |

 : NORMAL USE GEAR SHIFT STAGE

 : GEAR SHIFT STAGE USED AT LOW SOC, ETC.

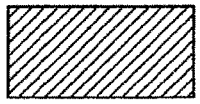 : GEAR SHIFT STAGE THAT CANNOT BE SELECTED BY SHIFT MECHANISM

 : GEAR SHIFT STAGE NOT NORMALLY USED

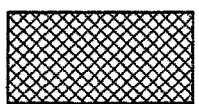 : GEAR SHIFT STAGE THAT CANNOT BE SELECTED BY INTERLOCK

FIG. 4

ENERGY MANAGEMENT CONTROL DEVICE FOR HYBRID VEHICLE

CROSS-REFERENCE TO RELATED APPLICATIONS

This application is a U.S. National stage application of International Application No. PCT/JP2015/066746, filed Jun. 10, 2015.

BACKGROUND

Field of the Invention

The present invention relates to an energy management control device for a hybrid vehicle, comprising an electric motor and an internal combustion engine as power sources, and that is provided with a transmission having a plurality of engagement clutches as shifting elements that are meshingly engaged by a stroke from a disengaged position.

Background Information

Conventionally, a hybrid vehicle drive device comprising a transmission having a plurality of engagement clutches as shifting elements that are meshingly engaged by a stroke from a disengaged position, is known (for example, refer to Japanese Laid-Open Patent Application No. 2014-101065—Patent Document 1). In addition, in a hybrid vehicle EV, traveling by motor driving is carried out at the time of start or during low-speed traveling, in order to increase fuel efficiency.

SUMMARY

However, with a plurality of engagement clutches that are meshingly engaged, there is the possibility of a failure occurring in which an engagement clutch is locked in the disengaged position and cannot be engaged, or, conversely, of a failure occurring in which an engagement clutch is locked in an engaged state and cannot be released. Consequently, if the power sources (engine, motor) cannot be disconnected from the drive wheels, it becomes impossible to carry out idle power generation while the vehicle is stopped, in which motor power generation is carried out by the drive force of the engine. As a result, if the battery charge capacity (hereinbelow referred to as "battery SOC") is insufficient, there is the problem that an EV start, in which the vehicle is started by driving the motor with the battery power, cannot be carried out.

In view of the problems described above, an object of the present invention is to provide an energy management control device for a hybrid vehicle with which it is possible to suppress the occurrence of a situation in which an EV start is not possible due to insufficient battery charge capacity.

In order to achieve the object described above, the hybrid vehicle to which the present invention is applied has an electric motor and an internal combustion engine as power sources, does not have a starting element, and has a transmission comprising a plurality of engagement clutches as a shifting element that are meshingly engaged by a stroke from a disengaged position, on a drive power transmission system from the power sources to the drive wheels. In addition, the hybrid vehicle carries out an EV start using the electric motor, to which electrical power from the battery is supplied, as a drive source, when starting the vehicle. The energy management control device for a hybrid vehicle is provided with an energy management controller that carries out management based on a battery capacity condition for keeping the charge capacity of the battery in a predetermined battery use charge capacity range, in preparation for EV start. When an engagement clutch failure is determined, the energy management controller expands the battery use charge capacity range more than when the engagement clutch is normal.

Therefore, in the energy management control device for a hybrid vehicle of the present invention, when an engagement clutch failure is determined, the energy management controller expands the battery use charge capacity range more than when the engagement clutch is normal. Therefore, for example, if the lower limit value of the battery use charge capacity range of the battery, which is the discharge limit value, is increased, driving by the electric motor is permitted until the charge capacity of the battery is over-discharged more than normally, to thereby ensure an EV start. On the other hand, if the upper limit value of the battery use charge capacity range of the battery, which is the charge limit value, is increased, power generation by the electric motor is permitted until the charge capacity of the battery is over-discharged more than normally, to thereby secure the charge capacity for an EV start. As a result, in the energy management control device for a hybrid vehicle of the present invention, it is possible to suppress an occurrence of a situation in which an EV start is not possible due to insufficient battery charge capacity.

BRIEF DESCRIPTION OF THE DRAWINGS

Referring now to the drawings, an energy management control device for a hybrid vehicle is illustrated.

FIG. 4 is an engagement table illustrating the gear shift stages according to the switching positions of three engagement clutches in a multistage gear transmission mounted on a hybrid vehicle to which is applied the energy management control device of the first embodiment.

DETAILED DESCRIPTION OF THE EMBODIMENTS

Figure 1:
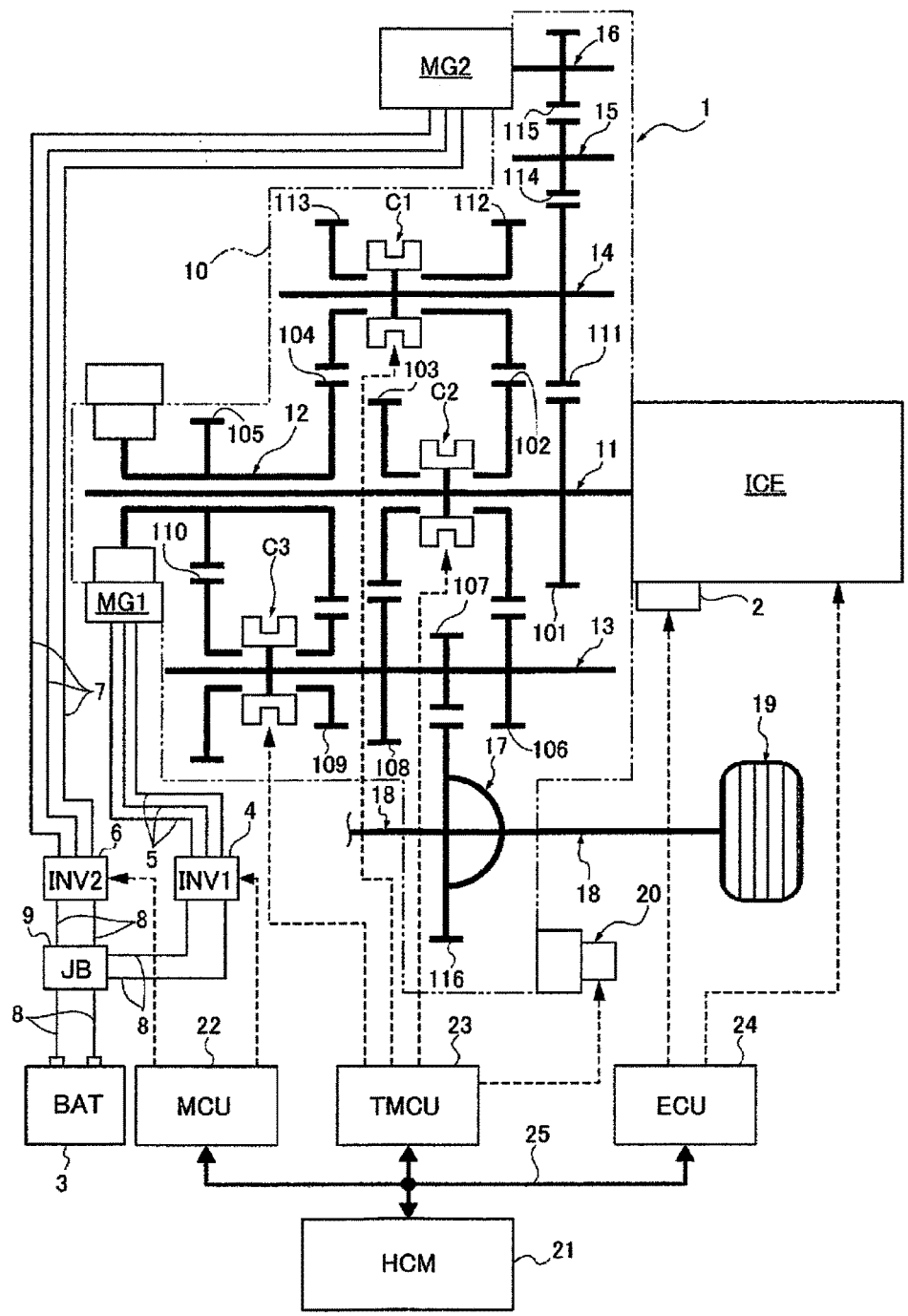
FIG. 1 is an overall system view illustrating a drive system and a control system of a hybrid vehicle to which is applied the energy management control device in a first embodiment.

A preferred embodiment for realizing the energy management control device for an electrically driven vehicle of the present invention is explained below based on a first embodiment illustrated in the drawings.

First Embodiment

The configuration is described first. The energy management control device for an electrically driven vehicle of the first embodiment is applied to a hybrid vehicle (one example of a hybrid vehicle), comprising, as drive system components, one engine, two motor/generators, and a multistage gear transmission having three engagement clutches. The "overall system configuration," the "configuration of the hybrid vehicle control system," the "configuration of the shift control system," the "configuration of the gear shift stages and the shift schedule map," and the "configuration of the energy management control process" will be separately described below, regarding the configuration of the energy management control device for an electrically driven vehicle in the first embodiment.

Overall System Configuration

FIG. 1 illustrates a drive system and a control system of a hybrid vehicle to which is applied the starting control device of the first embodiment. The overall system configuration will be described below based on FIG. 1.

The drive system of the hybrid vehicle comprises an internal combustion engine ICE, a first motor/generator (first electric motor) MG1, a second motor/generator (second electric motor) MG2, and a multistage gear transmission 1 having first to third engagement clutches C1, C2, C3. "ICE" is an acronym for "Internal-Combustion Engine."

The internal combustion engine ICE is, for example, a gasoline engine or a diesel engine that is disposed in a front compartment of a vehicle such that the crankshaft direction is in the vehicle width direction. The internal combustion engine ICE is connected to a transmission case 10 of the multistage gear transmission 1, and the output shaft of the internal combustion engine is connected to a first shaft 11 of the multistage gear transmission 1. The internal combustion engine ICE basically carries out an MG2 start, where the second motor/generator MG2 is used as a starter motor. However, a starter motor 2 is provided in preparation for when an MG2 start using a high-power battery 3 cannot be ensured, such as during extreme cold.

Both the first motor/generator MG1 and the second motor/generator MG2 are permanent magnet types of synchronous motors utilizing three-phase alternating current, having the high-power battery 3 as a common power source.

The stator of the first motor/generator MG1 is fixed to a case of the first motor/generator MG1, and the case is fixed to the transmission case 10 of the multistage gear transmission 1. Then, a first motor shaft integrated to a rotor of the first motor/generator MG1 is connected to a second shaft 12 of the multistage gear transmission 1.

The stator of the second motor/generator MG2 is fixed to a case of the second motor/generator MG2, and the case is fixed to the transmission case 10 of the multistage gear transmission 1. Then, a second motor shaft integrated to a rotor of the second motor/generator MG2 is connected to a sixth shaft 16 of the multistage gear transmission 1.

A first inverter 4, which converts direct current into three-phase alternating current during powering and converts three-phase alternating current into direct current during regeneration, is connected to a stator coil of the first motor/generator MG1, via a first AC harness 5. A second inverter 6, which converts direct current into three-phase alternating current during powering and converts three-phase alternating current into direct current during regeneration, is connected to a stator coil of the second motor/generator MG2, via a second AC harness 7. The high-power battery 3, the first inverter 4, and the second inverter 6 are connected by a DC harness 8, via a junction box 9.

The multistage gear transmission 1 is a normally meshing transmission comprising a plurality of gear pairs having different transmission ratios, and comprises first to sixth gear shafts 11-16 provided with gears and disposed parallel to each other inside the transmission case 10, and first to third engagement clutches C1, C2, C3 for selecting a gear pair. A first shaft 11, a second shaft 12, a third shaft 13, a fourth shaft 14, a fifth shaft 15, and a sixth shaft 16 are provided as gear shafts. A first engagement clutch C1, a second engagement clutch C2, and a third engagement clutch C3 are provided as engagement clutches. The transmission case 10 is provided with an electric oil pump 20 that supplies lubrication oil to the meshing portions of the gears and the axle bearing portions inside the case.

The first shaft 11 is a shaft to which the internal combustion engine ICE is connected, and a first gear 101, a second gear 102, and a third gear 103 are disposed on the first shaft 11, in order from the right side in FIG. 1. The first gear 101 is integrally provided (including integral fixing) to the first shaft 11. The second gear 102 and the third gear 103 are idling gears, in which a boss portion that protrudes in the axial direction is inserted into the outer perimeter of the first shaft 11, and are provided so as to be drivably connectable to the first shaft 11 via the second engagement clutch C2.

The second shaft 12 is connected to the first motor/generator MG1, and is a cylindrical shaft that is coaxially disposed with the axis aligned with the outer side position of the first shaft 11, and a fourth gear 104 and a fifth gear 105 are disposed on the second shaft 12, in order from the right side in FIG. 1. The fourth gear 104 and the fifth gear 105 are integrally provided (including integral fixing) onto the second shaft 12.

The third shaft 13 is a shaft disposed on the output side of the multistage gear transmission 1, and a sixth gear 106, a seventh gear 107, an eighth gear 108, a ninth gear 109, and a tenth gear 110 are disposed on the third shaft 13, in order from the right side in FIG. 1. The sixth gear 106, the seventh gear 107, and the eighth gear 108 are integrally provided (including integral fixing) onto the third shaft 13. The ninth gear 109 and the tenth gear 110 are idling gears, in which a boss portion that protrudes in the axial direction is inserted into the outer perimeter of the third shaft 13, and are provided so as to be drivably connectable to the third shaft 13 via the third engagement clutch C3.

Then, the sixth gear 106 meshes with the second gear 102 of the first shaft 11, the seventh gear 107 meshes with a sixteenth gear 116 of a differential gear 17, and the eighth gear 108 meshes with the third gear 103 of the first shaft 11. The ninth gear 109 meshes with the fourth gear 104 of the second shaft 12, and the tenth gear 110 meshes with the fifth gear 105 of the second shaft 12.

The fourth shaft 14 is a shaft in which both ends are supported to the transmission case 10, and an eleventh gear 111, a twelfth gear 112, and a thirteenth gear 113 are disposed on the fourth shaft 14, in order from the right side in FIG. 1. The eleventh gear 111 is integrally provided (including integral fixing) to the fourth shaft 14. The twelfth gear 112 and the thirteenth gear 113 are idling gears, in which a boss portion that protrudes in the axial direction is inserted into the outer perimeter of the fourth shaft 14, and are provided so as to be drivably connectable to the fourth shaft 14 via the first engagement clutch C1. Then, the eleventh gear 111 meshes with the first gear 101 of the first shaft 11, the twelfth gear 112 meshes with a second gear 102 of the first shaft 11, and the thirteenth gear 113 meshes with the fourth gear 104 of the second shaft 12.

The fifth shaft 15 has both ends are supported on the transmission case 10, and a fourteenth gear 114 that meshes with the eleventh gear 111 of the fourth shaft 14 is integrally provided thereto (including integral fixing). The sixth shaft 16 is connected to the second motor/generator MG2 is connected, and a fifteenth gear 115 that meshes with the fourteenth gear 114 of the fifth shaft 15 is integrally provided thereto (including integral fixing).

Then, the second motor/generator MG2 and the internal combustion engine ICE are mechanically connected to each other by a gear train configured from the fifteenth gear 115, the fourteenth gear 114, the eleventh gear 111, and the first gear 101, which mesh with each other. This gear train serves as a reduction gear train that decelerates the MG2 rotation speed at the time of an MG2 start of the internal combustion engine ICE by the second motor/generator MG2, and serves as a speed increasing gear train that accelerates the engine rotation speed at the time of MG2 power generation for generating the second motor/generator MG2, by the driving of the internal combustion engine ICE.

The first engagement clutch C1 is a dog clutch interposed between the twelfth gear 112 and the thirteenth gear 113 of the fourth shaft 14, and is engaged by an engagement stroke in a rotationally synchronized state without possessing a synchronization mechanism. When the first engagement clutch C1 is in a left engagement position (Left), the fourth shaft 14 and the thirteenth gear 113 are drivingly connected. When the first engagement clutch C1 is in a neutral position (N), the fourth shaft 14 and the twelfth gear 112 are released, and the fourth shaft 14 and the thirteenth gear 113 are released. When the first engagement clutch C1 is in a right engagement position (Right), the fourth shaft 14 and the twelfth gear 112 are drivingly connected.

The second engagement clutch C2 is a dog clutch that is interposed between the second gear 102 and the third gear 103 of the first shaft 11, and that is engaged by an engagement stroke in a rotationally synchronized state without possessing a synchronization mechanism. When the second engagement clutch C2 is in a left engagement position (Left), the first shaft 11 and the third gear 103 are drivingly connected. When the second engagement clutch C2 is in a neutral position (N), the first shaft 11 and the second gear 102 are released, and the first shaft 11 and the third gear 103 are released. When the second engagement clutch C2 is in a right engagement position (Right), the first shaft 11 and the second gear 102 are drivingly connected.

The third engagement clutch C3 is a dog clutch interposed between the ninth gear 109 and the tenth gear 110 of the third shaft 13, and is engaged by an engagement stroke in a rotationally synchronized state without possessing a synchronization mechanism. When the third engagement clutch C3 is in a left engagement position (Left), the third shaft 13 and the tenth gear 110 are drivingly connected. When the third engagement clutch C3 is in a neutral position (N), the third shaft 13 and the ninth gear 109 are released, and the third shaft 13 and the tenth gear 110 are released. When the third engagement clutch C3 is in a right engagement position (Right), the third shaft 13 and the ninth gear 109 are drivingly connected.

Then, a sixteenth gear 116 that meshes with the seventh gear 107 integrally provided (including integral fixing) to the third shaft 13 of the multistage gear transmission 1 is connected to left and right drive wheels 19 via the differential gear 17 and left and right drive shafts 18.

Configuration of the Hybrid Vehicle Control System

The control system of the hybrid vehicle comprises a hybrid control module 21, a motor control unit 22, a transmission control unit 23, and an engine control unit 24, as illustrated in FIG. 1.

The hybrid control module 21 (acronym: "HCM") is an integrated control means having the function of appropriately managing the energy consumption of the entire vehicle. The hybrid control module 21 is connected to the other control units (motor control unit 22, transmission control unit 23, engine control unit 24, etc.) so as to be capable of bidirectional information exchange by a CAN communication line 25. The "CAN" in CAN communication line 25 is an acronym for "Controller Area Network."

The motor control unit 22 (acronym: "MCU") carries out powering control, regeneration control, and the like, of the first motor/generator MG1 and the second motor/generator MG2, by control commands to the first inverter 4 and the second inverter 6. The control modes for the first motor/generator MG1 and the second motor/generator MG2 are "torque control" and "rotational speed FB control." In the "torque control," a control is carried out in which the actual motor torque is caused to follow a target motor torque, when a target motor torque to be shared with respect to a target drive force is determined. In the "rotational speed FB control" a control is carried out in which a target motor rotation speed, with which the input-output rotational speeds of the clutch are synchronized, is determined, and an FB torque is output so as to converge the actual motor rotation speed to the target motor rotation speed, when meshingly engage any one of the engagement clutches C1, C2, C3 at the time of a gear shift request.

The transmission control unit 23 (acronym: "TMCU") carries out a shift control for switching the gear shift pattern of the multistage gear transmission 1, by outputting a current command to electric actuators 31, 32, 33 (refer to FIG. 2), based on predetermined input information. In this shift control, the engagement clutches C1, C2, C3 are selectively mesh engaged/released, and a gear pair involved in power transmission is selected from the plurality of pairs of gear pairs. Here, at the time of a gear shift request to engage any one of the released engagement clutches C1, C2, C3, in order to suppress differential rotation speed between the input-output of the clutch to carry out meshing engagement, a rotational speed FB control (rotation synchronization control) of the first motor/generator MG1 or the second motor/generator MG2 is used in combination.

The engine control unit 24 (acronym: "ECU") carries out start control of the internal combustion engine ICE, stop control of the internal combustion engine ICE, fuel cut control, and the like, by outputting a control command to the motor control unit 22, a spark plug, a fuel injection actuator, or the like, based on predetermined input information.

Configuration of the Shift Control System

The multistage gear transmission 1 is characterized in that efficiency is achieved by reducing drag by employing, first to third engagement clutches C1, C2, C3 (dog clutches) as shifting element that are meshingly engaged. Then, when there is a gear shift request to meshingly engage any one of the engagement clutches C1, C2, C3, the differential rotation speeds of the input-output of the clutch are brought within a synchronization determination rotational speed range by a rotation synchronization operation of one of the two motor/generators MG1, MG2, to carry out an engagement stroke, thereby realizing the gear shift. Rotation synchronization is carried out by the first motor/generator MG1 when engaging the third engagement clutch C3, and rotation synchronization is carried out by the second motor/generator MG2 when engaging the first and the second engagement clutches C1, C2. In addition, when there is a gear shift request to release any one of the engaged engagement clutches C1, C2, C3, the clutch transmission torque of the release clutch is reduced, and a disengagement stroke is started once the torque becomes equal to or less than a release torque determination value, to realize the gear shift. The configuration of the shift control system of the multistage gear transmission 1 is described below based on FIG. 2.

Figure 2:
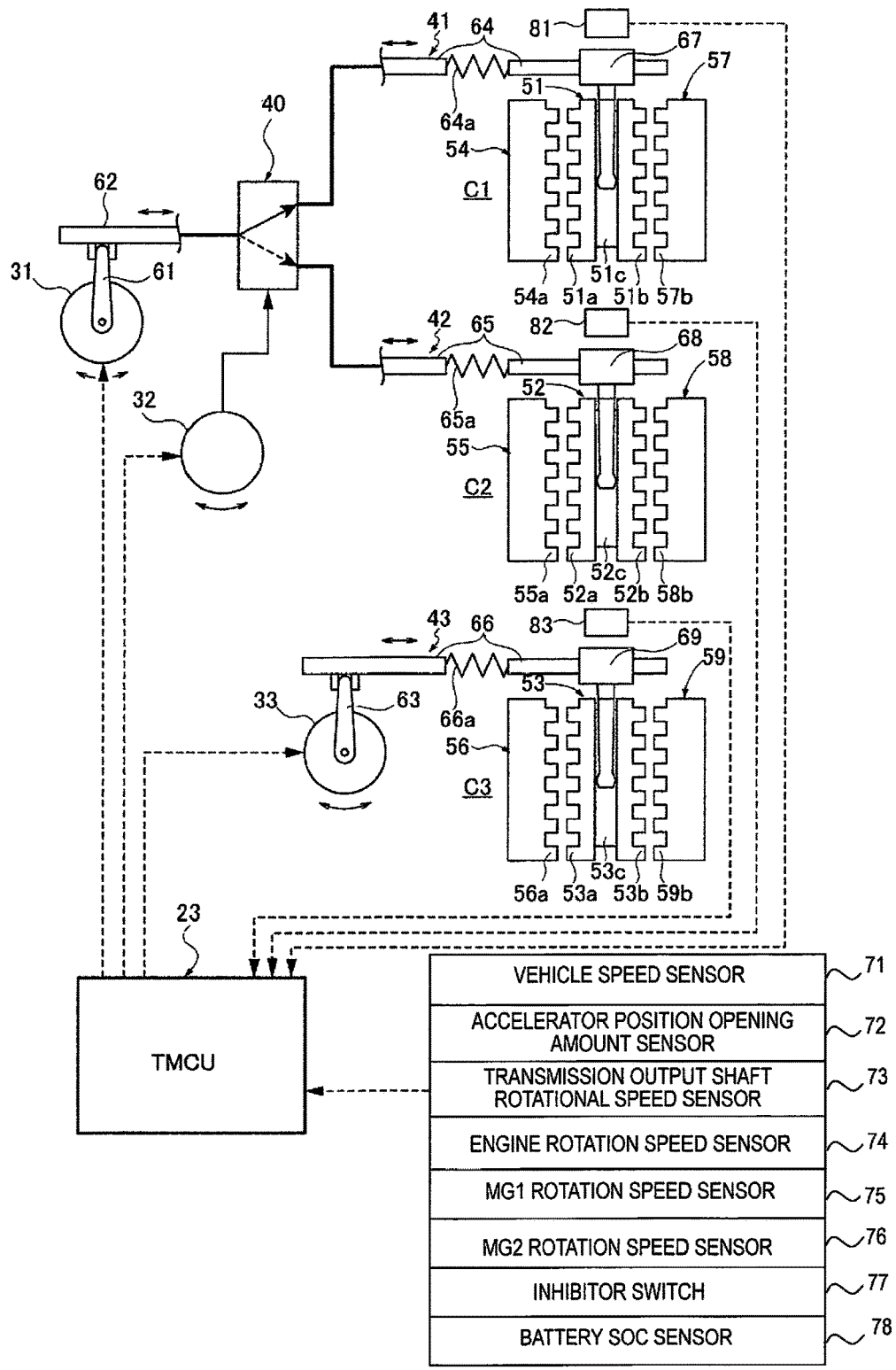
FIG. 2 is a control system block diagram illustrating the configuration of a shift control system of a multistage gear transmission mounted on a hybrid vehicle to which is applied the energy management control device of the first embodiment.

The multistage gear transmission 1 comprises, as a shift control system thereof, a first engagement clutch C1, a second engagement clutch C2, and a third engagement clutch C3, as illustrated in FIG. 2. In addition, the multistage gear transmission 1 comprises, as actuators of the shift control system thereof, a first electric actuator 31 for C1, C2 shift operations, a second electric actuator 32 for C1, C2 select operations, and a third electric actuator 33 for C3 shift operations.

Then, the multistage gear transmission 1 comprises a C1/C2 select operation mechanism 40, a C1 shift operation mechanism 41, a C2 shift operation mechanism 42, and a C3 shift operation mechanism 43, as shift mechanisms that convert actuator operations into clutch engagement/disengagement operations. The operations of the first electric actuator 31, the second electric actuator 32, and the third electric actuator 33 are controlled by the transmission control unit 23.

The first engagement clutch C1, the second engagement clutch C2, and the third engagement clutch C3 are dog clutches that switch between a neutral position (N: disengaged position), a left engagement position (Left: left side clutch meshing engagement position), and a right engagement position (Right: right side clutch meshing engagement position). The engagement clutches C1, C2, C3 all have the same configuration, comprising coupling sleeves 51, 52, 53, left dog clutch rings 54, 55, 56, and right dog clutch rings 57, 58, 59.

The coupling sleeves 51, 52, 53 are provided so as to be strokable in the axial direction by a spline connection via a hub, which is not shown, fixed to the fourth shaft 14, the first shaft 11, and the third shaft 13 (refer to FIG. 1). These coupling sleeves 51, 52, 53 have dog teeth 51a, 51b, 52a, 52b, 53a, 53b on both sides having flat top faces. Furthermore, fork grooves 51c, 52c, 53c are provided to the circumferential center portions of the coupling sleeves 51, 52, 53.

The left dog clutch rings 54, 55, 56 are fixed to the boss portions of the gears 113, 103, 110 (refer to FIG. 1), which are left idling gears of the engagement clutches C1, C2, C3, and have dog teeth 54a, 55a, 56a with flat top faces that oppose the dog teeth 51a, 52a, 53a.

The right dog clutch rings 57, 58, 59 are fixed to the boss portions of the gears 112, 102, 109 (refer to FIG. 1), which are right idling gears of the engagement clutches C1, C2, C3, and have dog teeth 57b, 58b, 59b with flat top faces that oppose the dog teeth 51b, 52b, 53b.

The C1/C2 select operation mechanism 40 is a mechanism for selecting between a first position for selecting a connection between the first electric actuator 31 and the C1 shift operation mechanism 41, and a second position for selecting a connection between the first electric actuator 31 and the C2 shift operation mechanism 42.

When selecting the first position, the C1/C2 select operation mechanism 40 connects a shift rod 62 and a shift rod 64 of the first engagement clutch C1, and locks a shift rod 65 of the second engagement clutch C2 in the neutral position. When selecting the second position, the C1/C2 select operation mechanism 40 connects a shift rod 62 and the shift rod 65 of the second engagement clutch C2, and locks the shift rod 64 of the first engagement clutch C1 in the neutral position.

That is, the C1/C2 select operation mechanism 40 is such that, when selecting a position from among the first position and the second position, where one of the engagement clutches is shifted, the other engagement clutch is locked and fixed in the neutral position.

The C1 shift operation mechanism 41, the C2 shift operation mechanism 42, and the C3 shift operation mechanism 43 convert the turning motions of the first and third electric actuators 31, 33 into axial stroke motions of the coupling sleeves 51, 52, 53. The shift operating mechanisms 41, 42, 43 all have the same configuration, comprising turning links 61, 63, shift rods 62, 64, 65, 66, and shift forks 67, 68, 69. One end of each of the turning links 61, 63 is provided on the actuator shafts of the first and third electric actuators 31, 33, with the other ends connected to one of the shift rods 64 (or shift rod 65), 66 so as to be relatively displaceable. The shift rods 64, 65, 66 are configured to be capable of expanding and contracting according to the magnitude and the direction of the rod transmitting force, by having springs 64a, 65a, 66a interposed in the rod dividing positions. One end of each of the shift forks 67, 68, 69 is fixed to the shift rods 64, 65, 66, with the other ends disposed in one of the fork grooves 51c, 52c, 53c of the coupling sleeves 51, 52, 53.

The transmission control unit 23 inputs sensor signals and switch signals from a vehicle speed sensor 71, an accelerator position opening amount sensor 72, a transmission output shaft rotational speed sensor 73, an engine rotation speed sensor 74, an MG1 rotation speed sensor 75, an MG2 rotation speed sensor 76, an inhibitor switch 77, a battery SOC sensor 78, and the like. The transmission output shaft rotational speed sensor 73 is provided on the shaft end portion of the third shaft 13 (refer to FIG. 1) and detects the shaft rotation speed of the third shaft 13.

Then, the transmission control unit 23 is provided with a position servo control unit (for example, a position servo system by PID control), which controls meshing engagement and disengagement of the engagement clutches C1, C2, C3, determined by the positions of the coupling sleeves 51, 52, 53. This position servo control unit inputs sensor signals from a first sleeve position sensor 81, a second sleeve position sensor 82, and a third sleeve position sensor 83. Then, the position servo control unit outputs a current to the electric actuators 31, 32, 33 such that the positions of the coupling sleeves 51, 52, 53 will be in the disengaged position or the engagement position according to an engagement stroke.

That is, by setting an engaged state in which the dog teeth welded to the coupling sleeves 51, 52, 53 and the dog teeth welded to the idling gears are both in engagement positions meshed with each other, the engagement clutches C1, C2, C3 drivingly connect the idling gears to the fourth shaft 14, the first shaft 11, and the third shaft 13. On the other hand, by setting a disengaged state in which the dog teeth welded to the coupling sleeves 51, 52, 53 and the dog teeth welded to the idling gears are in non-engagement positions by displacing the coupling sleeves 51, 52, 53 in the axial direction, the idling gears are disconnected from the fourth shaft 14, the first shaft 11, and the third shaft 13.

Configuration of the Gear Shift Stages and the Shift Schedule Map

The multistage gear transmission 1 is characterized in that size reduction is achieved by reducing the power transmission loss by not having a differential rotation absorbing element, such as a fluid coupling, and by reducing the gear shift stages of the ICE by providing motor assistance to the internal combustion engine ICE (EV gear shift stages: 1-2 speed, ICE gear shift stages: 1-4 speed). The configuration of the gear shift stages of the multistage gear transmission 1 is described below based on FIG. 3 and FIG. 4.

Figure 3:
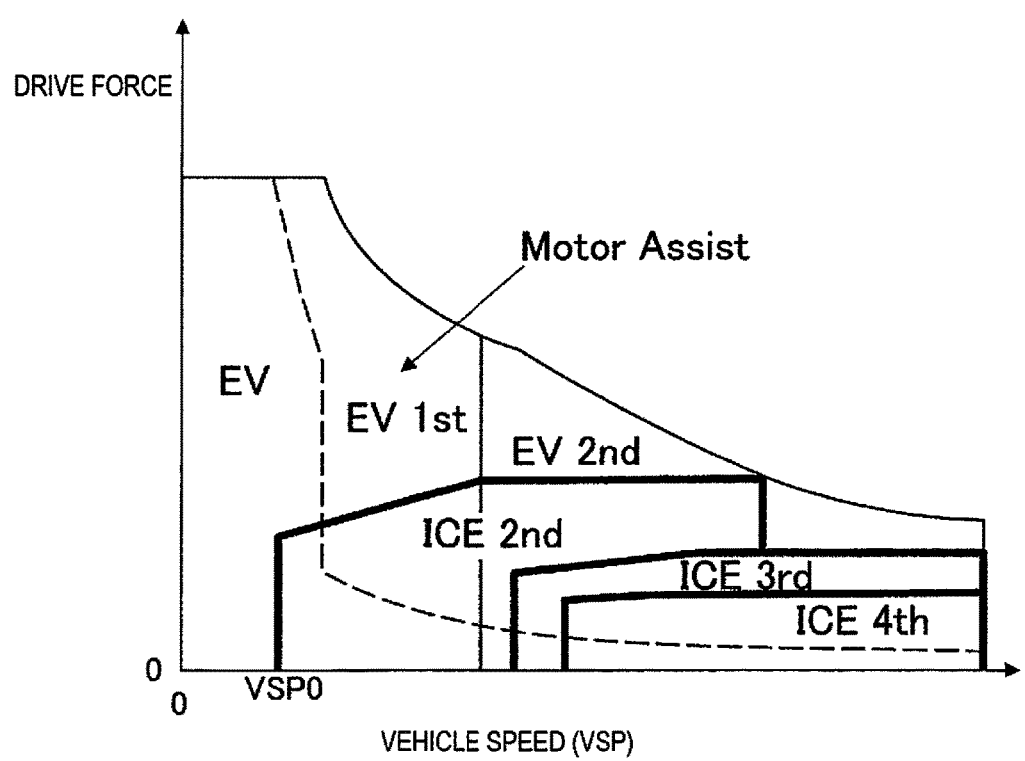
FIG. 3 is a schematic overview of a shifting map illustrating a concept of switching the gear shift pattern in a multistage gear transmission mounted on a hybrid vehicle to which is applied the energy management control device of the first embodiment.
Figure 5:
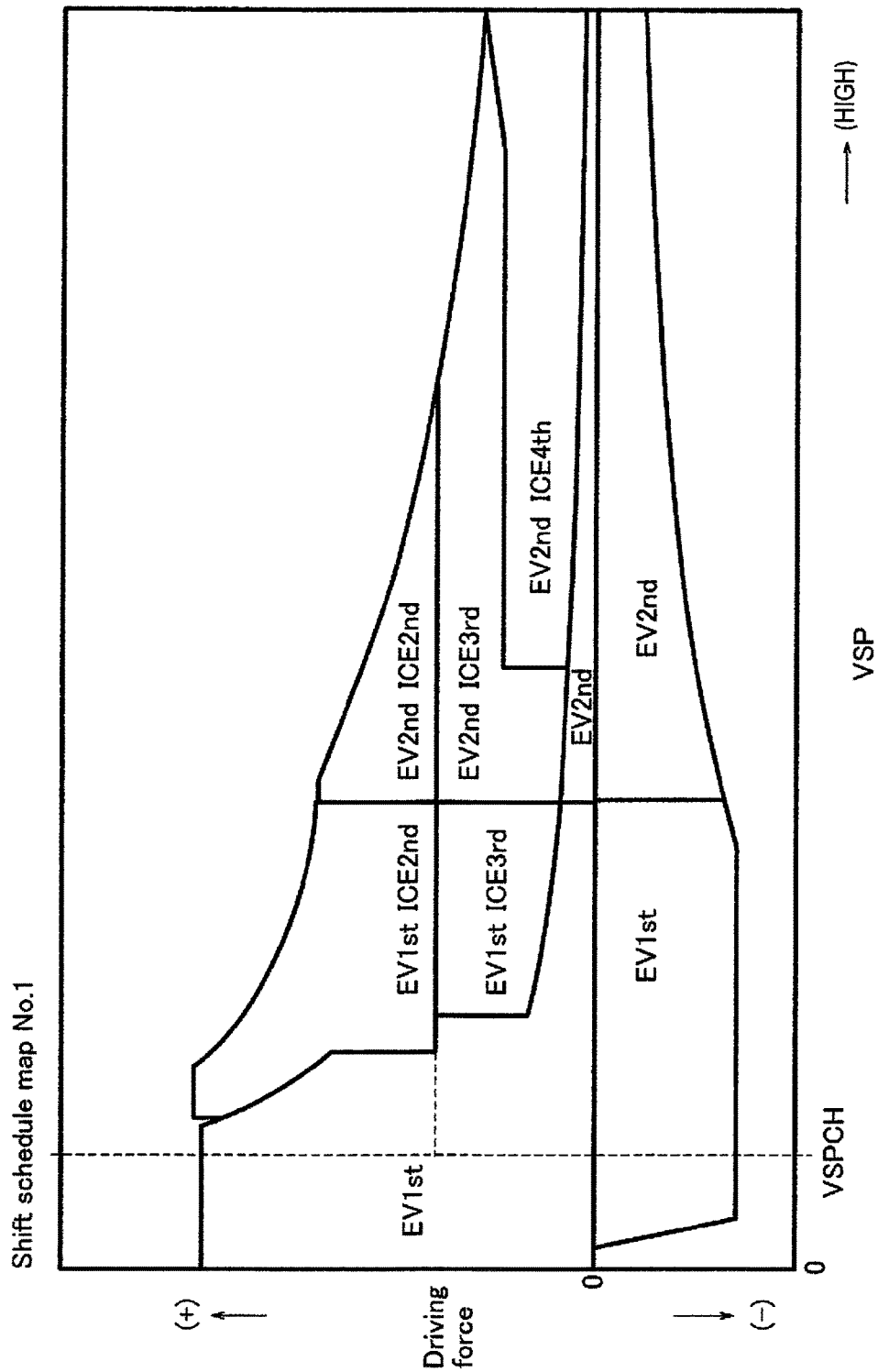
FIG. 5 is a first shift schedule map illustrating the switching region of the gear shift stage that is selected during travel when the battery SOC is in a normal capacity region excluding the low SOC region and the high SOC region.

A concept of the gear shift stages is employed in which, when the vehicle speed VSP is in a starting region equal to or less than a predetermined vehicle speed VSP0, since the multistage gear transmission 1 does not have a starting element (slipping element), a motor start by only the motor driving force is carried out in the "EV mode," as illustrated in FIG. 3. Then, when in the traveling region and the demand for driving force is great, a "parallel HEV mode" is employed in which the engine driving force is assisted by the motor driving force. That is, as the vehicle speed VSP increases, the ICE gear shift stages shift from (ICE1st→) ICE2nd→ICE3rd→ICE4th, and the EV gear shift stages shift from EV1st→EV2nd.

All of the gear shift stages theoretically obtainable by the multistage gear transmission 1 having the first to the third engagement clutches C1, C2, C3 are as shown in FIG. 4. In FIG. 4, "Lock" represents an interlock gear shift stage that is not applicable as a gear shift stage, "EV-" represents a state in which the first motor/generator MG1 is not drivingly connected to the driving wheels 19, and "ICE-" represents a state in which the internal combustion engine ICE is not drivingly connected to the driving wheels 19. Each of the gear shift stages is described below.

When the second engagement clutch C2 is "N" and the third engagement clutch C3 is "N," the following gear shift stages are obtained according to the position of the first engagement clutch C1. "EV-ICEgen" is obtained if the first engagement clutch C1 is "Left," "Neutral" is obtained if the first engagement clutch C1 is "N," and "EV-ICE3rd" is obtained if the first engagement clutch C1 is "Right." Here, the gear shift stage "EV-ICEgen" is a gear shift stage selected at the time of MG1 idle power generation, in which power is generated in the first motor/generator MG1 by the internal combustion engine ICE when the vehicle is stopped, or at the time of double idle power generation in which MG2 power generation is carried out in addition to MG1 power generation. The gear shift stage "Neutral" is a gear shift stage selected at the time of MG2 idle power generation, in which power is generated in the second motor/generator MG2 by the internal combustion engine ICE when the vehicle is stopped.

When the second engagement clutch C2 is "N" and the third engagement clutch C3 is "Left," the following gear shift stages are obtained according to the position of the first engagement clutch C1. "EV1st ICE1st" is obtained if the first engagement clutch C1 is "Left," "EV1st ICE-" is obtained if the first engagement clutch C1 is "N," and "EV1st ICE3rd" is obtained if the first engagement clutch C1 is "Right." Here, the gear shift stage "EV1st ICE-" is a gear shift stage selected when in the "EV mode" in which the internal combustion engine ICE is stopped and traveling is carried out by the first motor/generator MG1, or in the "series HEV mode" in which a first-speed EV traveling is carried out by the first motor/generator MG1 while power is generated in the second motor/generator MG2 by the internal combustion engine ICE.

When the second engagement clutch C2 is "Left" and the third engagement clutch C3 is "Left," "EV1st ICE2nd" is obtained if the position of the first engagement clutch C1 is "N." When the second engagement clutch C2 is "Left" and the third engagement clutch C3 is "N," the following gear shift stages are obtained according to the position of the first engagement clutch C1. "EV1.5 ICE2nd" is obtained if the first engagement clutch C1 is "Left," and "EV-ICE2nd" is obtained if the first engagement clutch C1 is "N." When the second engagement clutch C2 is "Left" and the third engagement clutch C3 is "Right," "EV2nd ICE2nd" is obtained if the position of the first engagement clutch C1 is "N."

When the second engagement clutch C2 is "N" and the third engagement clutch C3 is "Right," the following gear shift stages are obtained according to the position of the first engagement clutch C1. "EV2nd ICE3rd'" is obtained if the first engagement clutch C1 is "Left," "EV2nd ICE-" is obtained if the first engagement clutch C1 is "N," and "EV2nd ICE3rd" is obtained if the first engagement clutch C1 is "Right." Here, the gear shift stage "EV2nd ICE-" is a gear shift stage selected when in the "EV mode" in which the internal combustion engine ICE is stopped and traveling is carried out by the first motor/generator MG1, or in the "series HEV mode" in which a second-speed EV travel is carried out by the first motor/generator MG1 while power is generated in the second motor/generator MG2 by the internal combustion engine ICE.

When the second engagement clutch C2 is "Right" and the third engagement clutch C3 is "Right," "EV2nd ICE4th" is obtained if the position of the first engagement clutch C1 is "N." When the second engagement clutch C2 is "Right" and the third engagement clutch C3 is "N," the following gear shift stages are obtained according to the position of the first engagement clutch C1. "EV2.5 ICE4th" is obtained if the first engagement clutch C1 is "Left," and "EV-ICE4th" is obtained if the first engagement clutch C1 is "N." When the second engagement clutch C2 is "Right" and the third engagement clutch C3 is "Left," "EV1st ICE4th" is obtained if the position of the first engagement clutch C1 is "N."

Described next is a method to separate the "normal use gear shift stage" from all the above-described gear shift stages achieved by engagement combinations of the first to the third engagement clutches C1, C2, C3. First, gear shift stages excluding the "interlock gear shift stages (cross hatching in FIG. 4)" and "gear shift stages that cannot be selected by the shift mechanism (right up hatching in FIG. 4)" from all the gear shift stages shall be the plurality of gear shift stages that can be achieved by the multistage gear transmission 1. Here, gear shift stages that cannot be selected by the shift mechanism refer to "EV1.5 ICE2nd" in which the first engagement clutch C1 is "Left" and the second engagement clutch C2 is "Left," and "EV2.5 ICE4th" in which the first engagement clutch C1 is "Left" and the second engagement clutch C2 is "Right." The reason these gear shift stages cannot be selected by the shift mechanism is that one first electric actuator 31 is a shift actuator that is shared for use with two engagement clutches C1, C2, and that one of the engagement clutches is neutral locked by the C1/C2 select operation mechanism 40.

Then, gear shift stages excluding the "gear shift stages not normally used (right down hatching in FIG. 4)" and "gear shift stages used with low SOC, etc. (dashed line frame in FIG. 4)" from the plurality of gear shift stages that can be achieved by the multistage gear transmission 1 shall be the "normal use gear shift stage (thick line frame in FIG. 4)." Here, the "gear shift stages not normally used" are "EV2nd ICE3rd'" and "EV1st ICE4th," and the "gear shift stages used with low SOC, etc." are "EV-ICEgen" and "EV1st ICE1st."

Therefore, "normal use gear shift stages" are configured by adding "Neutral" to EV gear shift stages (EV1st ICE-, EV2nd ICE-), ICE gear shift stages (EV-ICE2nd, EV-ICE3rd, EV-ICE4th), and combination gear shift stages (EV1st ICE2nd, EV1st ICE3rd, EV2nd ICE2nd, EV2nd ICE3rd, EV2nd ICE4th).

Next, based on the concept of the gear shift stages illustrated in FIG. 3, four schedule maps, that is, first schedule map map1 to fourth schedule map map4, are set for issuing gear shift requests for switching the gear shift stage.

Figure 10:
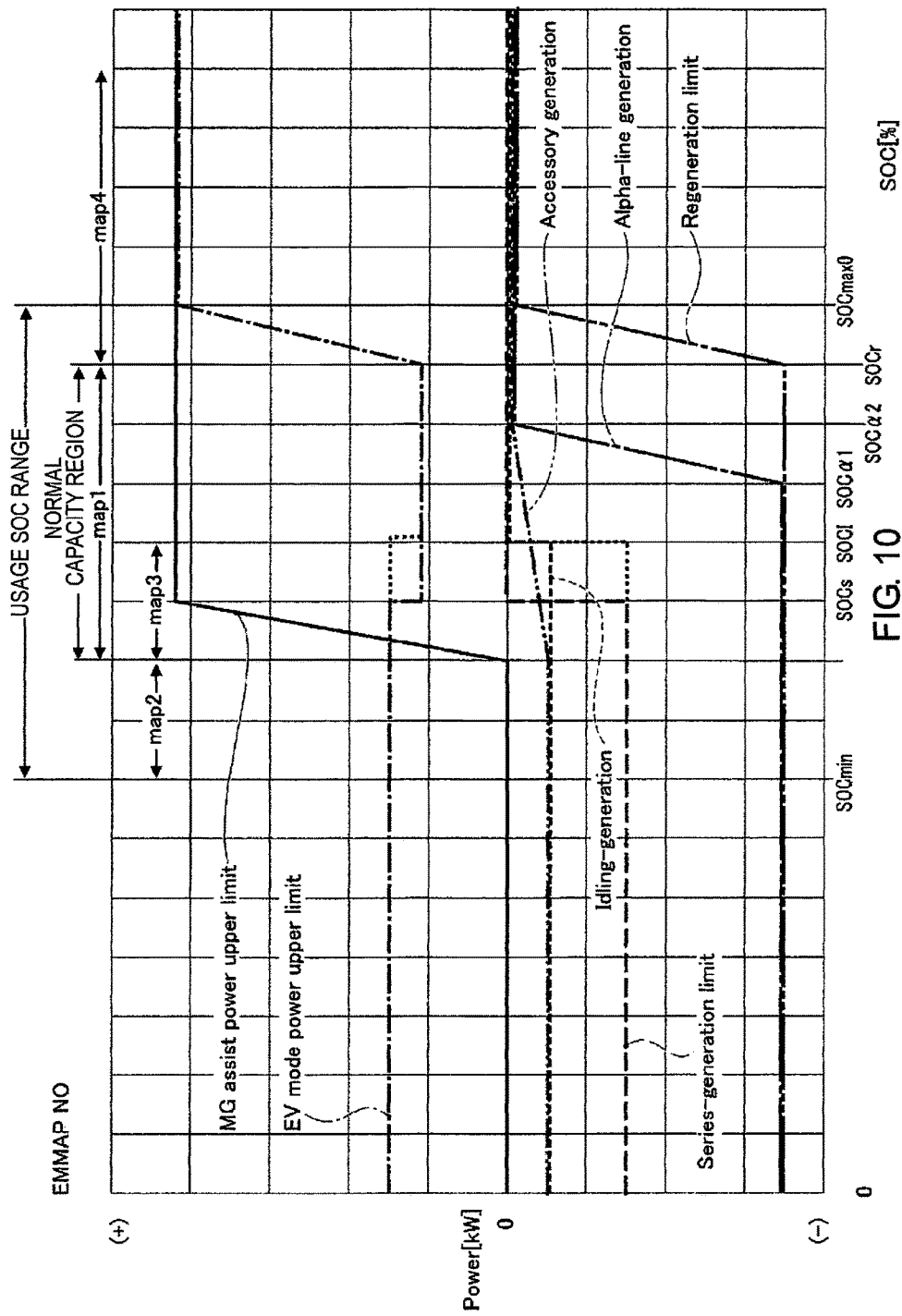
FIG. 10 is a normal energy management map EMMAPNO illustrating battery capacity condition when the engagement clutch is normal (not failing).

FIG. 10 shows a normal energy management map EMMAPNO or an energy management map that is normally used, the details of which are described below. As illustrated in this normal energy management map EMMAPNO, regions for using the above-described first schedule map map1 to fourth schedule map map4 are set according to the battery SOC.

That is, the first schedule map map1 is used while traveling in the normal capacity region (the region indicated as map1 in the figure), which excludes the low SOC region and the high SOC region of the battery SOC. In addition, the second schedule map map2 is used in the region in which the battery SOC is lower than the normal capacity region (the region indicated as map2 in the figure). The fourth schedule map map4, on the other hand, is used in the region in which the battery SOC is higher than the normal capacity region (the region indicated as map4 in the figure). Furthermore, the third schedule map map3 is used in the region in which the battery SOC is low in the normal capacity region (the region indicated as map3 in the figure).

The battery SOC of this third schedule map map3 is a sub-region of that of the first schedule map map1. This depends on whether or not series power generation by the second motor/generator MG2 is permitted: when permitted, the third schedule map map3 is used; when prohibited, the first schedule map map1 is used. The conditions under which series power generation by the second motor/generator MG2 are permitted or prohibited are not the substance of the present application, and the descriptions thereof are thereby omitted.

Specific configuration examples of the above-described first schedule map map1 to fourth schedule map map4 will be described below based on FIG. 5-FIG. 8, respectively. The "first shift schedule map map1" illustrated in FIG. 5 has vehicle speed VSP and required braking/driving force (Driving force) as the coordinate axes; selection regions in the coordinate plane of the figure are assigned for selecting from a plurality of gear shift stages that constitute a normal use gear shift stage group. That is, in the "first shift schedule map map1" the selection region "EV1st" is assigned to the low vehicle speed region after start, as a drive driving region by accelerator pedal depression. Then, the selection regions "EV2nd," "EV1st ICE2nd," "EV1st ICE3rd," "EV2nd ICE2nd," "EV2nd ICE3rd," and "EV2nd ICE4th" are assigned to the intermediate to high vehicle speed region. Regenerative braking regions for when coasting with the foot away from the accelerator pedal include the selection region "EV1st," which is assigned to the low vehicle speed region, and the selection region "EV2nd," which is assigned to the intermediate to high vehicle speed region.

Figure 6:
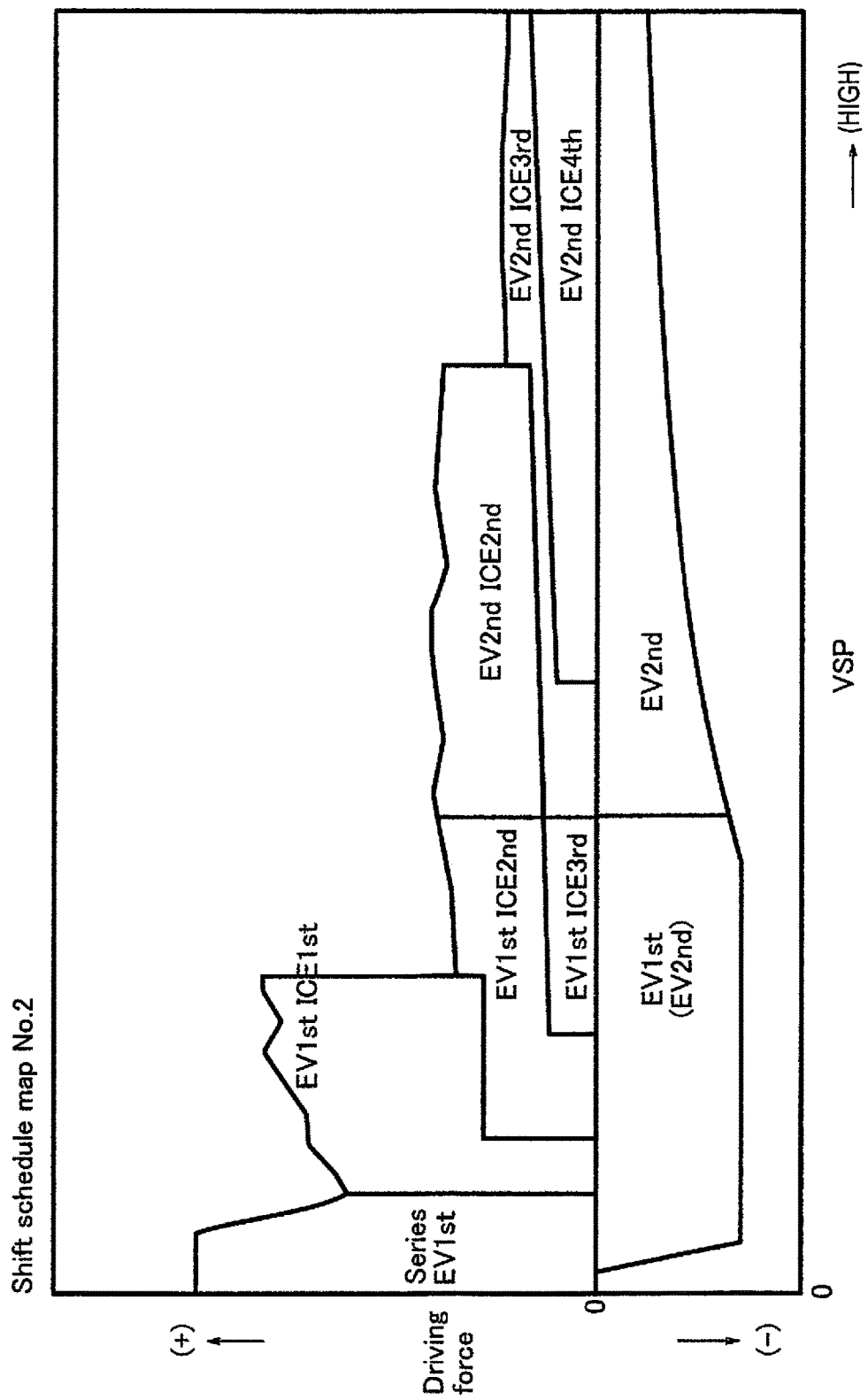
FIG. 6 is a second shift schedule map illustrating the switching region of the gear shift stage that is selected during travel when the battery SOC is in a low SOC region.

The "second shift schedule map map2" illustrated in FIG. 6 has vehicle speed VSP and required braking/driving force (Driving force) as the coordinate axes; selection regions in the coordinate plane of the figure are assigned for selecting from a plurality of gear shift stages that constitute a normal use gear shift stage group. In addition, compared with the "first schedule map map1," the "second schedule map map2" is a map in which "Series EV1st" and "EV1st ICE1st" are added to the drive driving region in the coordinate plane, while "EV2nd" is omitted, so as to suppress power consumption.

That is, in the "second shift schedule map map2" a selection region "Series EV1st" is assigned to the low vehicle speed region after start, as a drive driving region by accelerator pedal depression. Then, the selection regions "EV1st ICE1st," "EV1st ICE2nd," and "EV1st ICE3rd" are assigned to the intermediate vehicle speed region, and the selection regions "EV2nd ICE2nd," "EV2nd ICE3rd," and "EV2nd ICE4th" are assigned to the high vehicle speed region. Regenerative braking regions for when coasting with the foot away from the accelerator pedal include the selection region "EV1st (EV2nd)," which is assigned to the low vehicle speed region, and the selection region "EV2nd," which is assigned to the high vehicle speed region.

Figure 7:
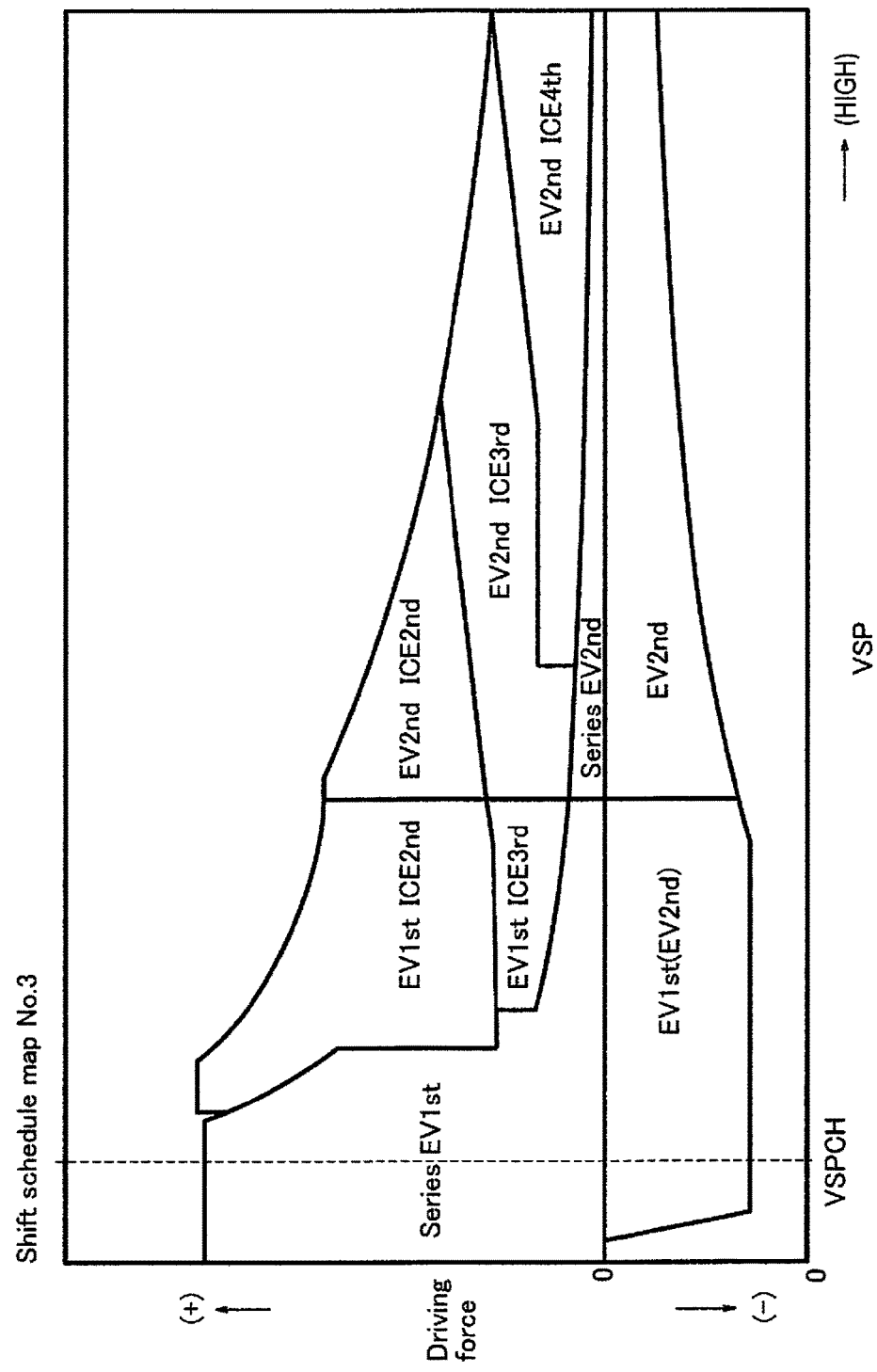
FIG. 7 is a third shift schedule map illustrating the switching region of the gear shift stage that is selected during travel in which power generation by the second motor/generator is prohibited, when the battery SOC is in the low SOC region within the normal capacity region.

In the "third shift schedule map map3" illustrated in FIG. 7, the selection regions "EV1st" and "EV2nd" in the EV mode are respectively assigned to "Series EV1st" and "Series EV2nd" in the drive driving region of the "first shift schedule map map1". That is, in the selection regions "Series EV1st" and "Series EV2nd," traveling is carried out by the first motor/generator MG1 while generating power by the second motor/generator MG2, in order to suppress a reduction, and even to achieve an increase, in the battery SOC.

The "fourth shift schedule map map4" has vehicle speed VSP and required braking/driving force (Driving force) as coordinate axes, in the same manner as each of the above-described shift schedule maps. Then, the "fourth shift schedule map" does not set a regenerative braking region for when traveling by coasting with the foot away from the accelerator pedal, and the EV traveling region is expanded while the shift is lowered during EV traveling.

That is, in the "fourth shift schedule map map4," when traveling while the battery SOC is in the high SOC region, an overcharging of the high-power battery 3 is suppressed by not carrying out power generation through regeneration. In addition, by lowering the shift during EV traveling, the motor rotation speed is set to have a tendency towards high rotational speed, to achieve an increase in the consumption of the battery SOC.

That is, compared with the "first shift schedule map map1," in the "fourth shift schedule map map4," the region for "EV1st ICE3rd" is eliminated from the intermediate vehicle speed region, and the "EV1" region is expanded. Additionally, compared with the "first shift schedule map map1," in the "fourth shift schedule map map4," "EV2nd" and "EV2nd ICE2nd" are broadened, while the selection regions "EV2nd ICE3rd," "EV2nd ICE4th" are narrowed.

Configuration of the Energy Management Control Process

Figure 9:
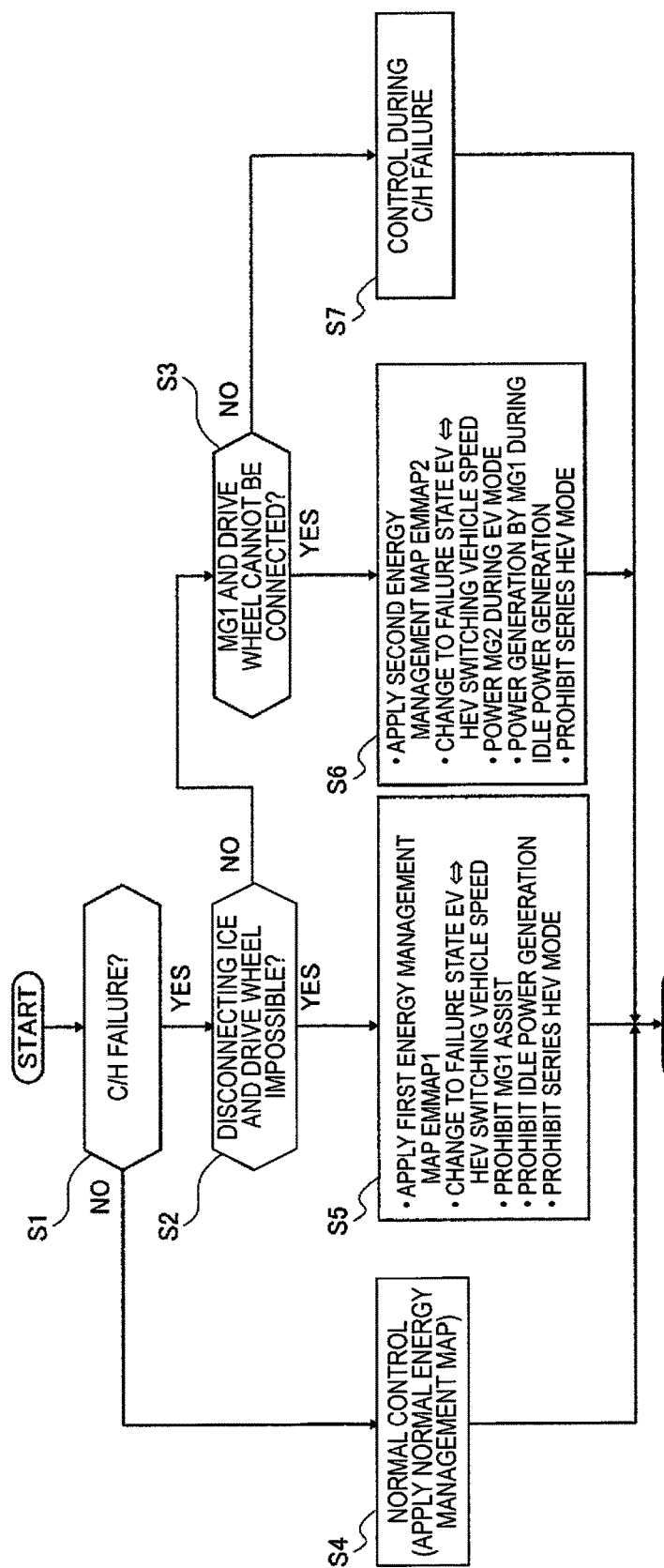
FIG. 9 is a flowchart illustrating the flow of an energy management control process carried out in a transmission control unit of the first embodiment.

FIG. 9 illustrates the flow of the energy management control process that is carried out in the transmission control unit 23 (energy management controller) of the first embodiment. Each of the steps in FIG. 9, which shows one example of the configuration of the energy management control process, will be described below.

The energy management control process carries out energy management based on battery capacity conditions for maintaining the battery SOC (charge capacity) of the high-power battery 3 at a predetermined battery use charge capacity range (usage SOC range in FIG. 10), in preparation for an EV start.

In Step S1, it is determined whether or not a failure has occurred in any of the engagement clutches C1, C2, C3. In Step S1, if YES (failure occurred), the process proceeds to Step S2, and if NO (failure not occurred), the process proceeds to Step S4.

In Step S4, after executing a normal control, the process returns to START, and repeats the process from Step S1. The normal control in Step S4 executes the energy management of an example vehicle based on the normal energy management map EMMAPNO shown in FIG. 10, described below.

In addition, in order to determine a clutch failure, for example, a failure can be determined when the command values to the clutches C1, C2, C3 from the transmission control unit 23 do not match the actual positions of the clutches C1, C2, C3 determined on the basis of a clutch position sensor.

In Step S2, following the determination of clutch failure in Step S1, it is determined whether or not the failure is one in which the internal combustion engine ICE and the drive wheels 19 cannot be disconnected. In Step S2, if YES (failure in which internal combustion engine ICE and drive wheels 19 cannot be disconnected), the process proceeds to Step S5; and if NO (other failure), the process proceeds to Step S3. A failure in which the internal combustion engine ICE and drive wheels 19 cannot be disconnected means a failure in which either the first engagement clutch C1 is fixed to the right engagement position (Right), or the second engagement clutch C2 is fixed to the left engagement position (Left) or the right engagement position (Right). Hereinbelow, this failure is referred to as the first fixed failure mode.

In Step S3, it is determined whether or not the failure is one in which the first motor/generator MG1 and the drive wheels 19 cannot be connected. In Step S3, if YES (failure in which first motor/generator MG1 and drive wheels 19 cannot be connected), the process proceeds to Step S6; and if NO (other failure), the process proceeds to Step S7. A failure in which the first motor/generator MG1 and drive wheels 19 cannot be connected is one in which the third engagement clutch C3 is fixed to the neutral position, which is hereinafter referred to as the second fixed failure mode. Additionally, in Step S7, a predetermined clutch failure control is carried out; however, since the energy management control of the present invention is not carried out in this clutch failure control, the description thereof is omitted.

Next, the energy management control in the normal control of Step S4, and the energy management control corresponding to the clutch failures of steps S5 and S6 will be described. First, in the normal control of Step S4, energy management control is carried out based on the normal energy management map EMMAPNO illustrated in FIG. 10. This normal energy management map EMMAPNO defines the output (Power) of the first motor/generator MG1 and the second motor/generator MG2 according to the battery SOC.

In FIG. 10, "MG assist power upper limit" defines the upper limit value when assist-driving the internal combustion engine ICE by the first motor/generator MG1 in the parallel HEV mode. This "MG assist power upper limit" is set to suppress power consumption by carrying out an assist in a region in which the battery SOC is relatively high, while being set to "0" and not carrying out an assist in a region in which the battery SOC is low.

The "EV mode power upper limit" defines the upper limit value of the drive force by the first motor/generator MG1 during travel in the EV mode. The "EV mode power upper limit" is set to be suppressed to a relatively low value to suppress power consumption in a low to intermediate region of the battery SOC, and is set to a high value to proactively carry out power consumption in a high battery SOC region.

"Idling-generation" defines the power generation characteristics of the internal combustion engine ICE during idling. The "Idling-generation" is set to generate power with the second motor/generator MG2 in order to charge the battery SOC when in a battery SOC region that is equal to or less than a predetermined value SOCI that is set as the intermediate range of the battery SOC, and to not generate power when in a battery SOC region that exceeds the predetermined value SOCI.

"Accessory generation" defines an additional power generation amount by the second motor/generator MG2 when in the parallel HEV mode. The "Accessory generation" is a characteristic similar to "Idling-generation," wherein power generation is carried out in a low battery SOC region, and power generation is not carried out in a high battery SOC region. "Accessory generation" is different from "Idling-generation" in that the power generation amount is gradually suppressed as the battery SOC increases, in an intermediate battery SOC region in the vicinity of the predetermined value SOCI.

"Series-generation limit" defines the upper limit value of the power generation amount when in the series HEV mode. The setting is such that power generation is carried out by the second motor/generator MG2 when in a region in which the battery SOC is lower than a predetermined value SOCs, which is set to the intermediate region of the battery SOC, and power generation is not carried out (=0) by the second motor/generator MG2 when in a region in which the battery SOC exceeds the predetermined value SOCs.

"Alpha-line generation" defines the upper limit value of the power generation amount when carrying out power generation with the first motor/generator MG1 while efficiently driving the internal combustion engine ICE when in the parallel HEV mode. In this "Alpha-line generation," full-scale power generation is carried out when the battery SOC is in a region below a predetermined value SOC$\alpha$1, and the power generation amount is suppressed as the battery SOC increases, when the battery SOC is in a region that is above the predetermined value SOCα1. Furthermore, "Alpha-line generation" is set so that the power generation amount to set to "0" when in a region above a second predetermined value SOCα2.

When driving the internal combustion engine ICE, it is desirable that the operating point follow a line (Alpha-line, hereinafter referred to as a line) that defines the high output efficiency of the internal combustion engine ICE. However, there are cases in which, during the driving of the internal combustion engine ICE, the operating point deviates from the α line in accordance with the required driving force of the driver.

In such cases, the operating point of the internal combustion engine ICE is brought close to the a line, while the drive torque of the first motor/generator MG1 is automatically controlled so as to close the gap between the driver's required torque and a target engine torque that is determined giving consideration to the a line. "Alpha-line generation" defines the upper limit value at the time of power generation during such control.

"Regeneration limit" defines the upper limit value of the power generation amount during regeneration by the first motor/generator MG1. The "Regeneration limit" is set to carry out full-scale power generation when in a battery SOC region that is below a predetermined value SOCr, and to suppress power generation as the battery SOC increases when in a region exceeding the predetermined value SOCr.

Next, the energy management control at the time of a clutch failure is described. In Step S5, to which the process proceeds in the case of the first fixed failure mode, in which the internal combustion engine ICE and the drive wheels 19 cannot be disconnected in Step S2 of FIG. 9, the following processing is carried out. In Step S5, first, the vehicle speed VSP at which EV traveling and parallel HEV mode are switched in the shift schedule is changed to a failure state EV⇔HEV switching vehicle speed VSPCH, which is slower than in the normal state. That is, the failure state EV ⇔EV switching vehicle speed VSPCH, which is a vehicle speed at which EV traveling and the parallel HEV mode are switched at the time of a clutch failure, is set to the position indicated by the dotted line in the first shift schedule map map1 of FIG. 5. In this case, on the higher speed side of the failure state EV⇔HEV switching vehicle speed VSPCH, the threshold value that partitions "EV 1st ICE2nd" and "EV 1st ICE3rd" is extended as indicated by the dotted line, and "EV 1st ICE2nd" and "EV 1st ICE3rd" are separated above and below the line.

Figure 8:
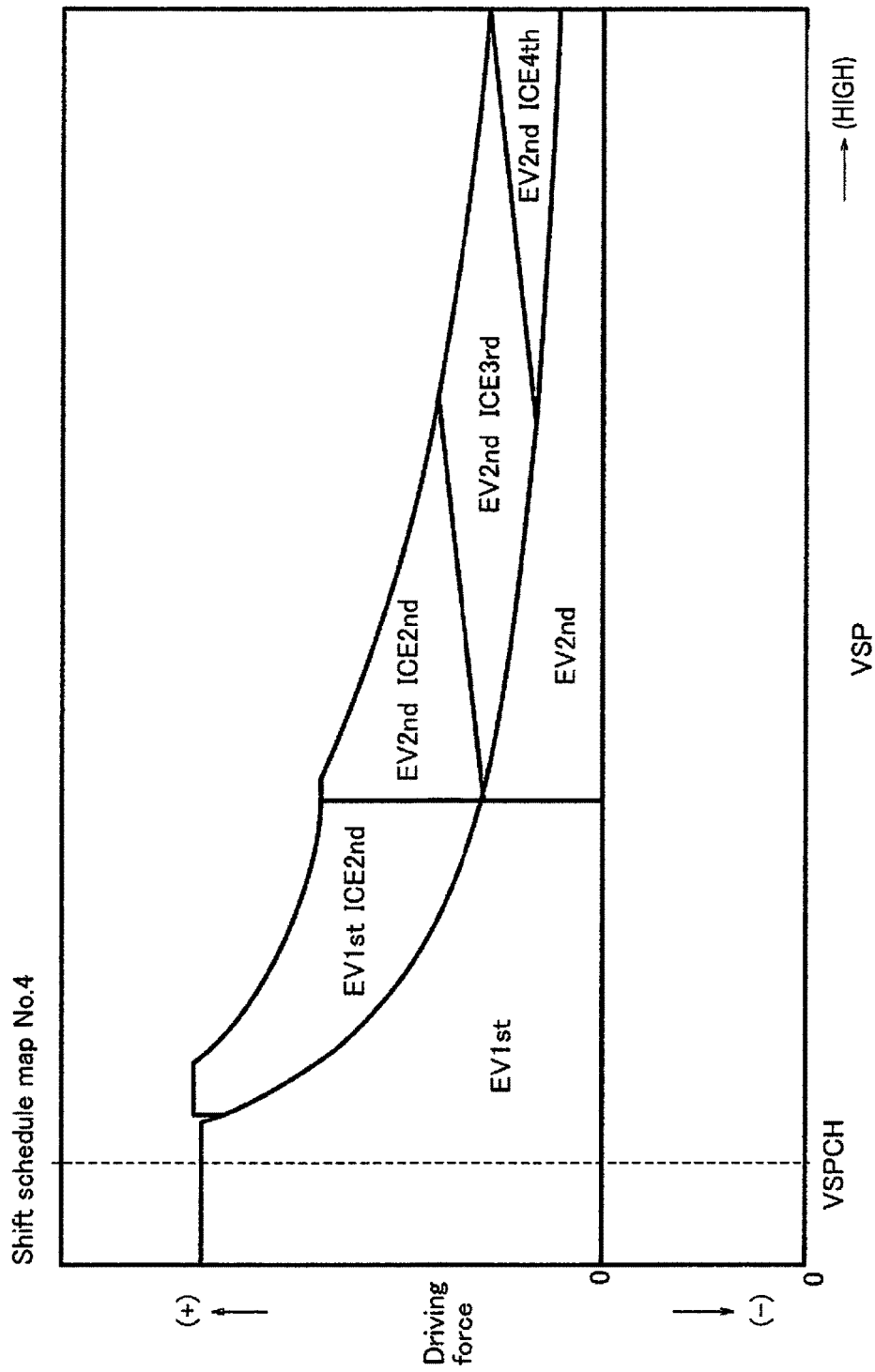
FIG. 8 is a fourth shift schedule map illustrating the switching region of the gear shift stage that is selected during travel when the battery SOC is in a high SOC region.

In addition, a failure state EV⇔HEV switching vehicle speed VSPCH is set in the third and fourth schedule maps map3, map4 shown in FIGS. 7 and 8, in a similar manner. In the fourth schedule map map4, "EV1st" is assigned to "EV1st ICE2nd" on the higher speed side of the failure state EV⇔HEV switching vehicle speed VSPCH. Similarly, "EV2nd" is assigned to "EV2nd ICE3rd" and "EV2nd ICE4th."

Figure 11:
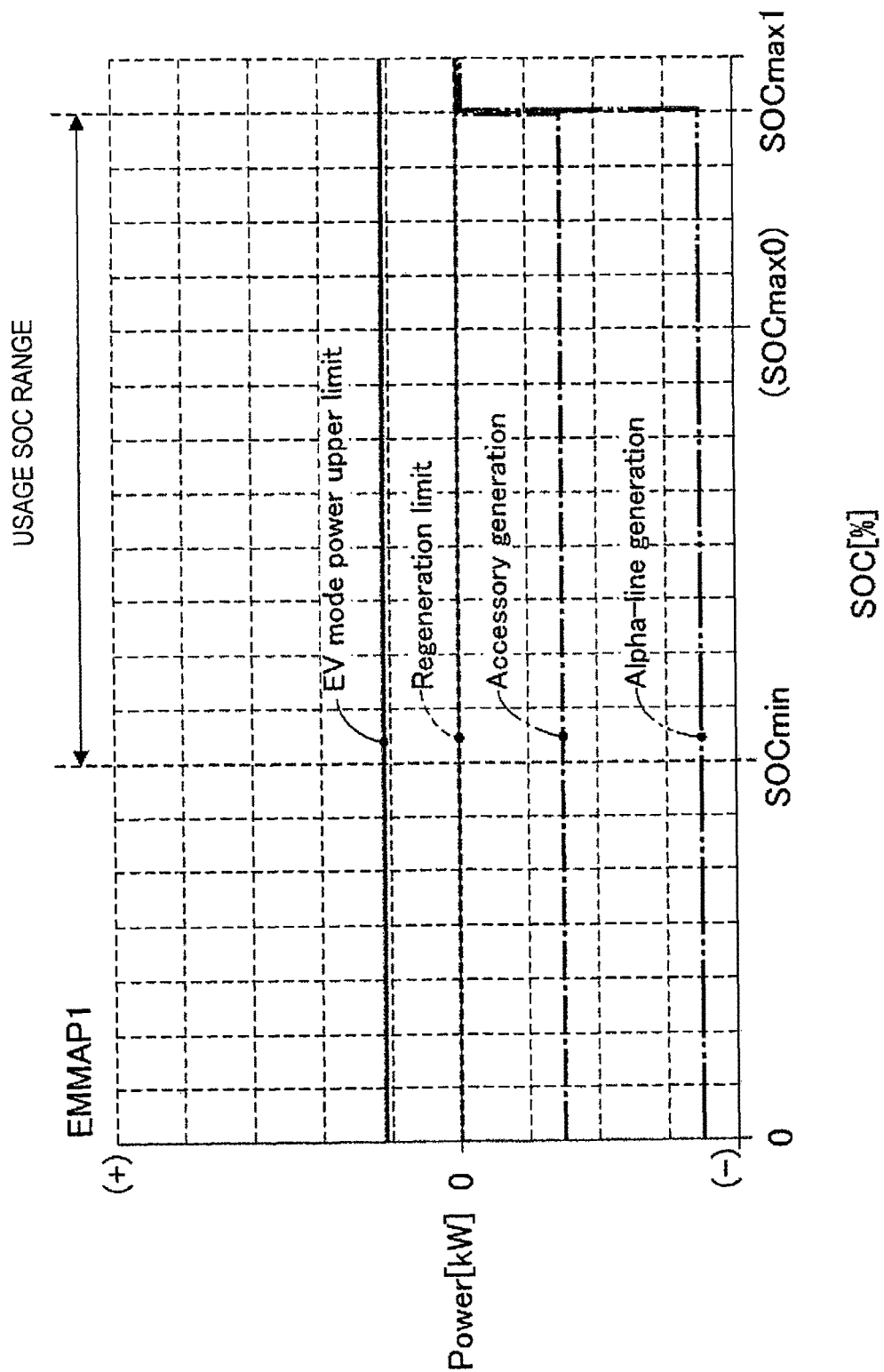
FIG. 11 is a first energy management map illustrating a battery capacity expansion condition at the time of a first fixed failure of an engagement clutch.

In addition, in Step S5, the map used for the energy management control is switched from the normal energy management map EMMAPNO to the first energy management map EMMAP1 shown in FIG. 11. In this first energy management map EMMAP1, the upper limit value SOCmax1 in the usage SOC range, which is the battery use charge capacity range, is set higher than the upper limit value SOCmax0 in the normal energy management map EMMAPNO (FIG. 10), as illustrated in FIG. 11. The battery use charge capacity range (usage SOC range) is thereby expanded. In the first embodiment, the lower limit value SOCmin in the usage SOC range is shared between the normal energy management map EMMAPNO and the first energy management map EMMAP1 as well as the second energy management map EMMAP2, which will be described below.

Furthermore, in this first energy management map EMMAP1, the "EV mode power upper limit" is set to an even lower value than in the normal energy management map EMMAPNO (FIG. 10). As a result, the power consumption during EV mode traveling is suppressed, and power consumption is also suppressed by expediting a transition to the parallel HEV mode to expand the traveling range of the parallel HEV mode.

Then, in this first energy management map EMMAP1, "Alpha-line generation" is set so as to carry out power generation even when the battery SOC is in a high region, compared with the normal energy management map EMMAPNO (FIG. 10), in order to expand the power generation region. Furthermore, in this first embodiment, power generation is prioritized with respect to an operation of the internal combustion engine ICE on the a line, and power generation based on "Alpha-line generation" of the first energy management map EMMAP. That is, when carrying out energy management control using the first energy management map EMMAP1, power generation by the first motor/generator MG1, based on "Alpha-line generation" corresponding to the battery SOC, is prioritized when in the parallel HEV mode. Therefore, in this case, there are instances in which operation of the internal combustion engine ICE that deviates from the α line is carried out.

In addition, in the first energy management map EMMAP1, "Accessory generation" is set to a value to increase the power generation amount, and the power generation range is expanded to the high battery SOC region, compared with the normal energy management map EMMAPNO (FIG. 10). That is, in the first fixed failure mode, the additional power generation amount by the second motor/generator MG2 in the parallel HEV mode is increased in the vicinity of the upper limit value thereof, and charging to capacity is carried out up to the high battery SOC region.

Additionally, regeneration is prohibited in the first fixed failure mode. That is, since engine braking by the internal combustion engine ICE acts in the first fixed failure mode, regeneration is prohibited. Accordingly, in the first energy management map EMMAP1, the "Regeneration limit" is set to 0.

In addition, in the first energy management map EMMAP1, an assist from the first motor/generator MG1 is prohibited to suppress power consumption. Thus, in the first energy management map EMMAP1, there is no setting of the "MG assist power upper limit," which is therefore not shown. Similarly, in the first energy management map EMMAP1, idle power generation by the first and second motor/generators MG1, MG2 is prohibited. Thus, in the first energy management map EMMAP1, there is no setting of the "Idling-generation," which is therefore not shown. That is, since the internal combustion engine ICE and the drive wheels 19 cannot be disconnected in the first fixed failure mode, idle power generation cannot be carried out, which is therefore prohibited. Similarly, since series power generation cannot be carried out in the first fixed failure mode, traveling in the series HEV mode is prohibited. Thus, in the first energy management map EMMAP1, there is no setting of the "Series-generation limit," which is therefore not shown.

Next, the process of Step S6 to which the process proceeds at the time of the second fixed failure mode will be described. In this Step S6 as well, the vehicle speed VSP at which EV traveling and parallel HEV mode are switched is changed to the failure state EV⇔HEV switching vehicle speed VSPCH, which is on the low speed side. In addition, in Step S6, energy management control is carried out based on the second energy management map EMMAP2 shown in FIG. 12. Furthermore, in Step S6, the second motor/generator MG2 is used as the power source in the EV mode, and idle power generation is carried out by the first motor/generator MG1.

Here, the second energy management map EMMAP2 is described. In the same manner as the first energy management map EMMAP 1, in this second energy management map EMMAP2, the upper limit value SOCmax2 in the usage SOC range, which is the battery use charge capacity range, is set to be greater than the upper limit value SOCmax0 in the normal energy management map EMMAPNO (FIG. 10), to expand the usage SOC range.

Furthermore, in the second energy management map EMMAP2, the "EV mode power upper limit" is set to a value lower than in the normal energy management map EMMAPNO (FIG. 10), and to a value higher than the "EV mode power upper limit" of the first energy management map EMMAP1. That is, in the second fixed failure mode, since the first motor/generator MG1 and the drive wheels 19 are not connected, when starting in the EV mode, the second motor/generator MG2 is used, and the second motor/generator MG2 is set to be fully driven. In this case as well, the power consumption during EV mode traveling is suppressed, and power consumption is also suppressed by expediting a transition to the parallel HEV mode.

Then, also in the second energy management map EMMAP2, "Alpha-line generation" is set so as to carry out power generation even when the battery SOC is in a high region, compared to the normal energy management map EMMAPNO (FIG. 10), in order to expand the power generation region, in the same manner as in the first energy management map EMMAP1. Additionally, in the same manner as the energy management control based on the first energy management map EMMAP1, with respect to operation of the internal combustion engine ICE on the α line, and power generation based on "Alpha-line generation" of the second energy management map EMMAP2, power generation is prioritized. That is, when carrying out energy management control using the second energy management map EMMAP2, power generation by the first motor/generator MG1, based on "Alpha-line generation" corresponding to the battery SOC, is prioritized when in the parallel HEV mode. Therefore, in this case, there are cases in which an operation of the internal combustion engine ICE that deviates from the α line is carried out.

Additionally, in the second energy management map EMMAP2, "Accessory generation" is set to be a lower value (increase in the power generation amount) than in the normal energy management map EMMAPNO (FIG. 10), and power generation is carried out up to the high battery SOC region, in the same manner as in the first energy management map EMMAP1. That is, even in the second fixed failure mode, the additional power generation amount by the second motor/generator MG2 in the parallel HEV mode is increased to the vicinity of the upper limit value thereof, and full-scale charging is carried out up to the high battery SOC region.

Furthermore, in the second energy management map EMMAP2, "Idling-generation" has the same characteristic as "Accessory generation," which is set to a characteristic in which the power generation amount is increased compared with the normal energy management map EMMAPNO (FIG. 10). As described above, in the second fixed failure mode, idle power generation is carried out by the first motor/generator MG1.

In addition, since regeneration by the first motor/generator MG1 cannot be carried out in the second fixed failure mode, regeneration is prohibited. Thus, in the second energy management map EMMAP2, the "Regeneration limit" is set to "0".

Additionally, since an assist by the first motor/generator MG1 cannot be carried out in the second energy management map EMMAP2, there is no setting of the "MG assist power upper limit," which is therefore not shown. Power consumption is suppressed by not carrying out this motor assist. Similarly, since traveling by the series HEV mode cannot be carried out in the second fixed failure mode, there is no setting of "Series-generation limit" in the second energy management map EMMAP2, which is therefore not shown.

Actions of the Embodiment

Next, the actions are described. First, the actions in the normal state (normal state) in which a failure is not occurring in the clutches C1, C2, C3 will be described. In this case, in the energy management control process, the process proceeds from Step S1→Step S4 in the flowchart of FIG. 9. In this case, the energy management control process is carried out based on the normal energy management map EMMAPNO shown in FIG. 10.

Next, the clutch failure state is described. If a clutch failure occurs, in the case of a first fixed failure mode in which the internal combustion engine ICE and the drive wheels 19 cannot be disconnected, the process proceeds from Step S1→Step S2→Step S5 in the flowchart of FIG. 9. Then, the energy management control process is changed from using the normal energy management map EMMAPNO to using the first energy management map EMMAP1, and the vehicle speed at which the EV mode and the parallel HEV mode are switched is changed to the failure state EV⇔HEV switching vehicle speed VSPCH.

On the other hand, if the clutch failure is a failure in which the first motor/generator MG1 and the drive wheels 19 cannot be connected, the process proceeds from Step S1→Step S2→Step S3→Step S6 in the flowchart of FIG. 9. Then, the energy management control process is changed from using the normal energy management map EMMAPNO to using the second energy management map EMMAP2, and the vehicle speed at which the EV mode and the parallel HEV mode are switched is changed to the failure state EV⇔HEV switching vehicle speed VSPCH.

Problems During Clutch Failure

Here, first, the problems that occur during this clutch failure if the energy management control process is carried out based on the normal energy management map EMMAPNO without changing to the first and second energy management maps EMMAP1, MAP2, and if the failure state EV⇔HEV switching vehicle speed VSPCH is not applied, will be described.

At the time of a first fixed failure mode, in which the internal combustion engine ICE and the drive wheels 19 cannot be disconnected, the vehicle will be started while creating a drag on the internal combustion engine ICE at the time of an EV start, thereby increasing the power consumption. In addition, in the case of a hybrid vehicle that does not have a starting element (slipping element) that absorbs differential rotation in the drive system from the power source to the drive wheels 19, as in the first embodiment, it is not possible to stop the EV start and to start the vehicle by the driving of the internal combustion engine ICE while causing the starting element to slip. Furthermore, in the first fixed failure mode, since the drive of the internal combustion engine ICE is transmitted to the drive wheels 19, idle power generation cannot be carried out when the vehicle is stopped. In addition, at the time of coasting with the foot away from the accelerator pedal, the internal combustion engine ICE acts as a load and so-called engine braking is effected; therefore, if regenerative power generation is carried out, the braking force becomes excessive. Additionally, in the first fixed failure mode, series traveling, in which electrical power is generated by the second motor/generator MG2, cannot be carried out during EV traveling by the first motor/generator MG1.

In this manner, in the first fixed failure mode, situations in which power generation is possible are reduced, while power consumption at the time of EV start is increased, and thus the battery SOC tends to decrease. Then, if the battery SOC falls below the lower limit value SOCmin of the usage SOC range, driving by the first motor/generator MG1 is not permitted, and the vehicle cannot be started.

In addition, at the time of a second fixed failure mode, in which the first motor/generator MG1 and the drive wheels 19 cannot be connected, EV travel by the first motor/generator MG1 cannot be carried out, and thus the vehicle cannot be started. Furthermore, when in the second fixed failure mode, series travel, in which electrical power is generated by the second motor/generator MG2, cannot be carried out during EV travel by the first motor/generator MG1, in the same manner as in the first fixed failure mode. In addition, regenerative power generation by the first motor/generator MG1 cannot be carried out while coasting in the second fixed failure mode. Additionally, since EV travel by the first motor/generator MG1 cannot be carried out in the second fixed failure mode, series travel, in which electrical power is generated by the second motor/generator MG2, also cannot be carried out during said traveling.

As described above, since situations in which power generation is possible are also reduced in the second fixed failure mode, the battery SOC tends to decrease. Therefore, in the second fixed failure mode, even the second motor/generator MG2 is configured to start the vehicle, however, if the battery SOC falls below the lower limit value SOCmin of the usage SOC range, the vehicle cannot be started, in the same manner as in the first fixed failure mode.

Operation in the Case of Clutch Failure in the First Embodiment

The operation in the case of a clutch failure in the first embodiment will be described. First, clutch failure in the first fixed failure mode, in which the internal combustion engine ICE and the drive wheels 19 cannot be disconnected, will be described. In this first fixed failure mode, first, the vehicle speed VSP at which EV traveling and parallel HEV mode are switched in each of the shifting maps is changed to a failure state EV⇔HEV switching vehicle speed VSPCH, which is slower than in the normal state. As a result, the transition timing to the parallel HEV mode is advanced after starting in the EV mode, and it is possible to suppress power consumption and a reduction in the battery SOC.

Furthermore, in the first fixed failure mode, the normal energy management map EMMAPNO is switched to the first energy management map EMMAP1. In this first energy management map EMMAP1, "Alpha-line generation" and "Accessory generation" are set to have characteristics with which the power generation amount is increased, and the power generation region is expanded to the high SOC region, compared with the normal energy management map EMMAPNO. Therefore, while traveling in the parallel HEV mode, the α line power generation by the first motor/generator MG1, and the additional power generation while traveling by the second motor/generator MG2, are respectively fully used. It is thereby possible to suppress a reduction in the battery SOC, and to maintain a high battery SOC.

Moreover, in the first energy management map EMMAP1, the upper limit value SOCmax1 of the usage SOC range is set higher than the upper limit value SOCmax0 of the normal energy management map EMMAPNO. Thus, when carrying out full power generation when in the parallel HEV mode as described above, it is possible to charge the battery to achieve a higher battery SOC than the upper limit value SOCmax0 of the normal usage SOC range, and to thereby further suppress a reduction in the battery SOC. Additionally, in the first energy management map EMMAP1, power consumption is suppressed and a reduction in the battery SOC is suppressed by prohibiting a motor assist.

As described above, since a reduction in the battery SOC can be suppressed in the first fixed failure mode, it is possible to prevent an occurrence of a problem in which the battery SOC falls below the lower limit value SOCmin of the usage SOC range such that the vehicle cannot be started by EV traveling.

In the first energy management map EMMAP1 that is used when in the first fixed failure mode, the following power generation operations are prohibited. That is, in the first energy management map EMMAP1, regeneration by the first motor/generator MG1 is prohibited. As a result, when in the first fixed failure mode in which the internal combustion engine ICE and the drive wheels 19 are kept in a connected state, it is possible to prevent an occurrence of excessive braking force, caused by carrying out regenerative power generation in addition to the load of the internal combustion engine ICE, during coasting. In addition, in the first energy management map EMMAP1, idle power generation and series traveling are prohibited. That is, in the first fixed failure mode, since EV traveling and idle power generation by the driving of the first motor/generator MG1 cannot be carried out, and are thus prohibited, it is possible to prevent problems that occur when carrying out idle power generation and series traveling using the normal energy management map EMMAPNO.

Next, the actions during the second fixed failure mode, in which the first motor/generator MG1 and the drive wheels 19 cannot be connected, will be described. In this second fixed failure mode, traveling is carried out by driving the second motor/generator MG2 in the EV mode. Then, in this second fixed failure mode, the vehicle speed VSP at which EV traveling and parallel HEV mode are switched in each of the shifting maps is changed to a failure state EV⇔HEV switching vehicle speed VSPCH, which is slower than in the normal state, in the same manner as in the first fixed failure mode. As a result, the transition timing to the parallel HEV mode is advanced after starting in the EV mode by the second motor/generator MG2, and it is possible to suppress the frequency of traveling by a low-output second motor/ generator MG2, as well as to suppress power consumption and a reduction in the battery SOC.

Furthermore, in the second fixed failure mode, the normal energy management map EMMAPNO is switched to the second energy management map EMMAP2. In this second energy management map EMMAP2, "Alpha-line generation" and "Accessory generation" are set to have characteristics with which the power generation amount is increased, and the power generation region is expanded to the high SOC region, compared to the normal energy management map EMMAPNO. Therefore, while traveling in the parallel HEV mode, the a line power generation by the first motor/generator MG1, and the additional power generation while traveling by the second motor/generator MG2, are respectively fully used. It is thereby possible to suppress a reduction in the battery SOC, and to maintain a high battery SOC.

Moreover, in the second energy management map EMMAP2, the upper limit value SOCmax2 of the usage SOC range is set higher than the upper limit value SOCmax0 of the normal energy management map EMMAPNO. Thus, when carrying out full power generation when in the parallel HEV mode as described above, it is possible to charge the battery to achieve a higher battery SOC than the upper limit value of the normal usage SOC range, and to thereby further suppress a reduction in the battery SOC.

Furthermore, in the second energy management map EMMAP2, idle power generation is carried out by the first motor/generator MG1. By carrying out idle power generation by the first motor/generator MG1, with a higher output than the second motor/generator MG2, it is possible to further suppress a reduction in the battery SOC.

In addition, since the drive force of the first motor/generator MG1 cannot be transmitted to the drive wheels 19 in the second fixed failure mode, a motor assist is prohibited in the second energy management map EMMAP2. Therefore, by also not carrying out an assist by the second motor/generator MG2, it is possible to suppress power consumption and a reduction in the battery SOC.

As described above, since a reduction in the battery SOC can also be suppressed in the second fixed failure mode, it is possible to prevent an occurrence of a problem in which the battery SOC falls below the lower limit value SOCmin of the usage SOC range such that the vehicle cannot be started by EV traveling.

In the second energy management map EMMAP2 that is used when in the second fixed failure mode, the following power generation operations are prohibited. That is, in the first energy management map EMMAP1, regeneration by the first motor/generator MG1 is prohibited. That is, since the first motor/generator MG1 and the drive wheels 19 are not connected and regeneration by the first motor/generator MG1 cannot be carried out, regeneration is prohibited.

In addition, in the second energy management map EMMAP2, series power generation travel is prohibited. That is, in the second fixed failure mode, since EV travel by driving of the first motor/generator MG1 cannot be carried out, and is thus prohibited, it is possible to prevent problems that occur when carrying out series power generation travel using the normal energy management map EMMAPNO.

Next, the effects of the first embodiment will be described. The effects listed below can be obtained by the energy management control device for a hybrid vehicle according to the first embodiment.

(1) The energy management control device for a hybrid vehicle according to the first embodiment is configured such that, in a hybrid vehicle that does not have a starting element in a drive power transmission system from power sources (internal combustion engine ICE, first motor/generator MG1, second motor/generator MG2) to a drive wheel 19, and that has a multistage gear transmission 1 having first to third engagement clutches C1, C2, C3 as a shifting element that are meshingly engaged by a stroke from a disengaged position, and carries out EV start using an electric motor (first motor/generator MG1) as a drive source t that receives electrical power from a high-power battery 3, when starting the vehicle, and comprising: an energy management controller (hybrid control module 21) is configured to carry out management in preparation for the EV starting based on a battery capacity condition, which is set to maintain the charge capacity of the high-power battery 3 (battery SOC) in a predetermined battery use charge capacity range (usage SOC range, FIG. 10) for permitting charging and discharging of the high-power battery 3, and upon determining a failure of the engagement clutches C1, C2, C3, the energy management controller (hybrid control module 21) expands the battery use charge capacity range more than when the engagement clutches C1, C2, C3 are normal. Specifically, the normal energy management map EMMAPNO is switched to the first energy management map EMMAP1 or the second energy management map EMMAP2, which have a wider battery use charge capacity range (usage SOC range, FIG. 10). Thus, compared to when the battery use charge capacity range is not expanded, it is possible to prevent the occurrence of a problem in which the battery SOC falls below the lower limit value SOCmin of the battery use charge capacity range (usage SOC range, FIG. 10) such that EV start cannot be carried out.

Figure 12:
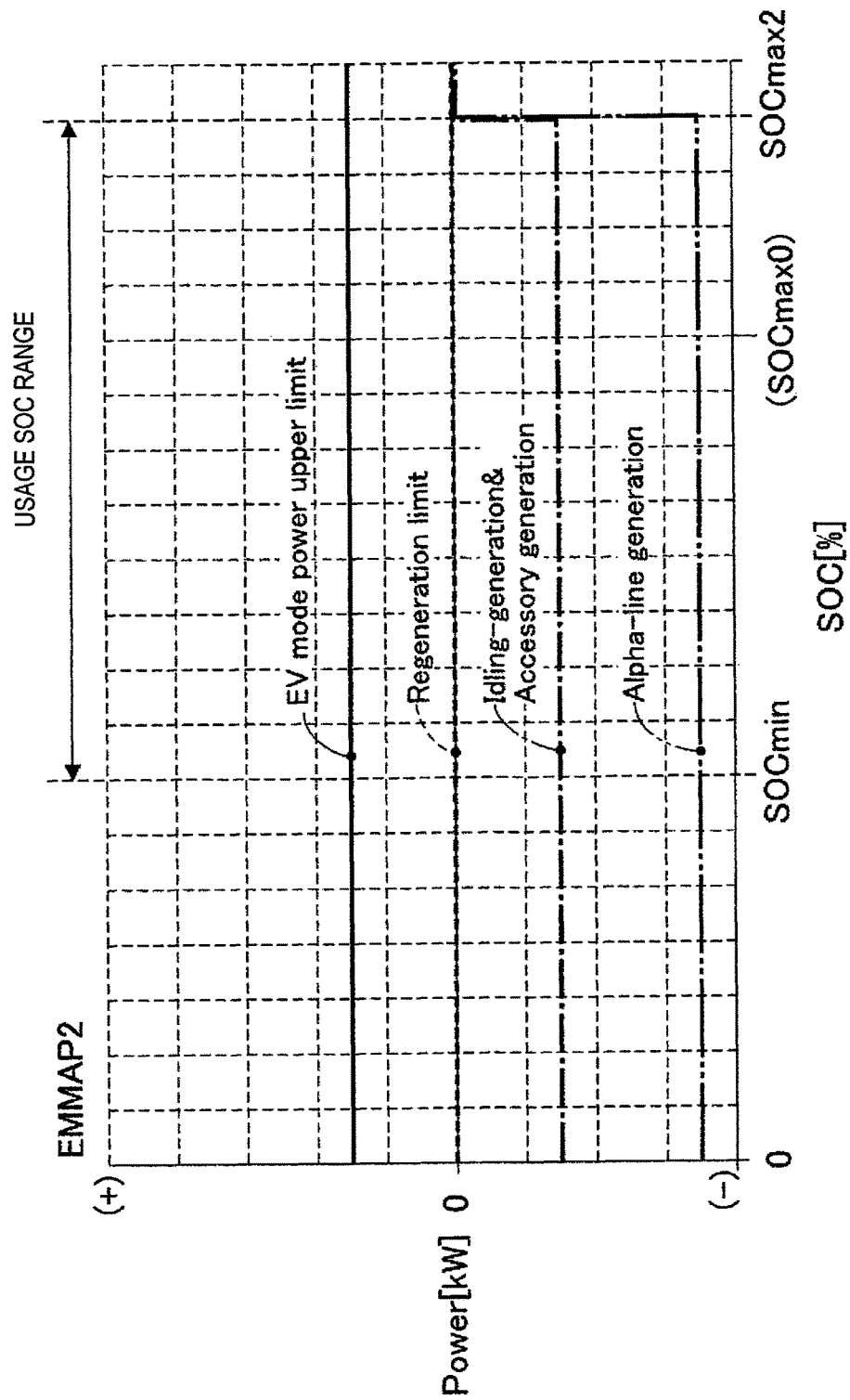
FIG. 12 is a second energy management map illustrating a battery capacity expansion condition at the time of a second fixed failure of an engagement clutch.

(2) The energy management controller (hybrid control module 21) of the energy management control device for a hybrid vehicle of the first embodiment expands the battery use charge capacity range by increasing upper limit values SOCmax1, SOCmax2 for permitting charging from a normal upper limit value (SOCmin), when changing to a battery capacity expansion condition (first energy management map EMMAP1, second energy management map EMMAP2) (usage SOC range in FIGS. 11 and 12). By expanding the battery use charge capacity range by increasing the upper limit values SOCmax1, SOCmax2 of the battery use charge capacity range (usage SOC range), it is possible to suppress over-discharging of the high-power battery 3 while obtaining the effect of (1).

(3) The energy management controller (hybrid control module 21) of the energy management control device for a hybrid vehicle of the first embodiment sets a mode switch vehicle speed, at which to switch to an HEV mode, wherein the internal combustion engine ICE is added to the power source, to a failure state EV⇔HEV switching vehicle speed VSPCH, which is slower than normal, after an EV start by the electric motor (first motor/generator MG1), when the failure of the engagement clutch is a first fixed failure mode, in which the internal combustion engine ICE and the drive wheels 19 cannot be disconnected. Thus, in addition to the effects of (1), (2), by suppressing the EV travel distance, it is possible to further suppress a reduction in the battery SOC, and to further suppress the occurrence of problems in which EV start cannot be carried out.

(4) The energy management controller (hybrid control module 21) of the energy management control device for a hybrid vehicle of the first embodiment uses a first energy management map EMMAP1, in which generated electrical power that is generated by electric motors during travel (α line power generation (Alpha-line generation) by the first motor/generator MG1, additional power generation (Accessory generation) by the second motor/generator MG2) is made to be at a higher output than the normally generated electrical power, at the time of the first fixed failure mode. Thus, in addition to the effect of (3), by achieving an increase in the battery SOC by increasing the generated electrical power during traveling, it is possible to further suppress a reduction in the battery SOC, and to further suppress the occurrence of problems in which an EV start cannot be carried out.

(5) The energy management control device for a hybrid vehicle according to the first embodiment comprises, as electric motors, a first motor/generator MG1 and a second motor/generator MG2, wherein the energy management controller (hybrid control module 21) carries out an EV start using the second motor/generator MG2, instead of an EV start using the first motor/generator MG1, when the failure of the engagement clutches C1, C2, C3 is a second fixed failure mode in which the first motor/generator MG1 and the drive wheels 19 cannot be connected. Thus, in addition to the effects of (1) to (4), an EV start becomes possible even in a situation in which an EV start by the first motor/generator MG1 cannot be carried out.

(6) In the energy management control device for a hybrid vehicle of the first embodiment, the second motor/generator MG2 is an electric motor having a smaller electrical power generation capability than the first motor/generator MG1, and the energy management controller (hybrid control module 21) carries out power generation during traveling by the second motor/generator MG2, and carries out idle power generation while stopping by the first motor/generator MG1, at the time of the second fixed failure mode. Thus, in addition to the effect of (5), by carrying out idle power generation by the first motor/generator MG1, it is possible to suppress the frequency of use of the second motor/generator MG2 when carrying out EV start by the second motor/generator MG2. In addition, it is possible to increase the power generation amount during idle power generation compared to when carrying out idle power generation by the second motor/generator MG2, to thereby suppress a reduction in the battery SOC.

(7) In the energy management control device for a hybrid vehicle according to the first embodiment, the first energy management map EMMAP1 and the second energy management map EMMAP2, which prohibit a motor assist, are used at the time of the first fixed failure mode and the second fixed failure mode. Therefore, it is possible to reduce the frequency of driving of the electric motors (first motor/generator MG1, second motor/generator MG2), to thereby suppress a reduction in the battery SOC.

(8) In the energy management control device for a hybrid vehicle according to the first embodiment, the first energy management map EMMAP1, which prohibits regeneration, is used at the time of the first fixed failure mode. Therefore, it is possible to prevent an occurrence of excessive braking force during coasting in the first fixed failure mode, in which the internal combustion engine ICE and the drive wheels 19 cannot be disconnected.

(9) In the energy management control device for a hybrid vehicle according to the first embodiment, the second energy management map EMMAP2, which prohibits regeneration by the second motor/generator MG2, is used at the time of the second fixed failure mode. Therefore, it is possible to suppress the frequency of use of the second motor/generator MG2, which has a low output, to thereby improve the durability of the second motor/generator MG2.

(10) In the energy management control device for a hybrid vehicle according to the first embodiment, when the engagement clutches C1, C2, C3 are normal, the internal combustion engine ICE is operated on an efficient a line that is set in advance, and a power generation upper limit value ("Alpha-line generation" in the normal energy management map EMMAPNO) when driving the first motor/generator MG1 is set so as to close a gap between the torque required by the driver and the engine required torque at the time of a line operation, and when there is a failure in the engagement clutches C1, C2, C3, the power generation upper limit value (normal energy management map "Alpha-line generation") is changed to a failure state power generation upper limit value ("Alpha-line generation" in the first and second energy management maps EMMAP1, EMMAP2), in which the limit of the power generation amount is increased, and power generation is carried out at this power generation upper limit value, while the internal combustion engine ICE is operated such that power generation can be carried out at this power generation upper limit value and the torque required by the driver can be obtained. Therefore, in addition to increasing the power generation amount at the time of an engagement clutch failure, it is possible to generate power without being limited by a line operation. Therefore, it is possible to further secure the battery SOC at the time of an engagement clutch failure.

The energy management control device of an electrically driven vehicle of the present invention was described above based on the first embodiment, but specific configurations thereof are not limited to this first embodiment, and various modifications and additions to the design can be made without departing from the scope of the invention according to each claim in the Claims.

In the first embodiment, an example was shown in which, when expanding the battery use charge capacity range (usage SOC range) at the time of an engagement clutch failure, compared to when the engagement clutch is normal, the upper limit value thereof was increased to achieve the expansion. However, the method to expand the battery use charge capacity range (usage SOC range) is not limited thereto; the lower limit value thereof can be lowered, or both solutions can be carried out at the same time. If the lower limit value of the battery use charge capacity range (usage SOC range) is set to be lower than normal at the time of a clutch failure, an EV start becomes possible even if the battery SOC falls below the normal lower limit value; therefore, it is possible to suppress the occurrence of problems in which EV start cannot be carried out. In addition, in the first embodiment, when expanding the battery use charge capacity range (usage SOC range) compared to when the engagement clutch is normal, the energy management map to be used itself is changed from the normal map, but no limitation is imposed thereby. For example, it is possible to achieve the desired effect by simply expanding the battery use charge capacity range (usage SOC range) in the normal energy management map.

In addition, in the first embodiment, an example was shown in which the energy management control device of the present invention was applied to a hybrid vehicle comprising, as drive system components, one engine, two motor/generators, and a multistage gear transmission having three engagement clutches. However, the energy management control device of the present invention may be applied to a vehicle comprising one motor/generator, or to a hybrid vehicle having a different number of engagement clutches in the multistage gear transmission than "three".

Additionally, in the first embodiment, the hybrid control module as the energy management controller is configured to use each of the energy management maps as a battery capacity condition; however, the characteristics defined by the energy management maps are not limited to the characteristics shown in the embodiment.

In addition, in the first embodiment, when in the first fixed failure mode, the generated electrical power during traveling is set to be at a higher output than the normally generated electrical power. Accordingly, in the first embodiment, the "Alpha-line generation" which defines the power generation by the first motor/generator, and the "Accessory generation" which defines the power generation by the second motor/generator, are both configured to be at a higher output than in a normal state. However, the present invention is not limited thereto, and only one may be set to be at a high output.

In addition, in the first embodiment, when in the second fixed failure mode, power generation during traveling is carried out by the second motor/generator, and idle power generation while the vehicle is stopped is carried out by the first motor/generator. However, the present invention is not limited thereto. For example, when in the second fixed failure mode, power generation during travel may be carried out by the first motor/generator, or by both the first and second motor/generators. Similarly, when in the second fixed failure mode, idle power generation while the vehicle is stopped may be carried out by the second motor/generator, or by both the first and second motor/generators.

Additionally, in the first embodiment, after an EV start, when the mode switch vehicle speed at which to switch to the HEV mode (failure state EV⇔HEV switching vehicle speed VSPCH) is changed to a lower speed than normal, the value is the same (VSPCH) in the first, third, and fourth shift schedule maps map1, map3, map4. However, a different value may be used for this mode switch vehicle speed (failure state EV⇔HEV switching vehicle speed VSPCH) in each of the maps. For example, in the third shift schedule map map3, which is used in a relatively low battery SOC region, the mode switch vehicle speed (failure state EV⇔HEV switching vehicle speed VSPCH) may be set to a relatively low value, to suppress the use of electrical power. Conversely, in the fourth shift schedule map map4, which is used in a relatively high battery SOC region, the mode switch vehicle speed (failure state EV⇔HEV switching vehicle speed VSPCH) may be set to a relatively high value, while being a lower value than normal.

The invention claimed is:

1. An energy management control device for a hybrid vehicle having an electric motor and an internal combustion engine as power sources of the vehicle, which does not have a starting element in a drive power transmission system from the power sources to a drive wheel, and having a transmission with a plurality of engagement clutches as shifting elements that are meshingly engaged by a stroke from a disengaged position, and
which carries out an EV start using the electric motor as a drive source that receives electrical power from a battery, when starting the vehicle, and comprising:
an energy management controller is configured to carry out management in preparation for the EV starting based on a battery capacity condition, which is set to keep a charge capacity of the battery in a predetermined battery use charge capacity range for permitting charging and discharging of the battery, and
upon determining a failure of the engagement clutches, the energy management controller expands the battery use charge capacity range more than when the engagement clutches are operating normally.

2. The energy management control device as recited in claim 1, wherein
the energy management controller expands the battery use charge capacity range by increasing an upper limit value for permitting charging from a normal value, when changing to a battery capacity expansion condition.

3. The energy management control device as recited in claim 1, wherein
the energy management controller sets a mode switch vehicle speed, at which to switch to an HEV mode where the internal combustion engine is added to the power source, to be slower than a normal state after an EV start by the electric motor, when the failure of the engagement clutches is a first fixed failure mode in which the internal combustion engine and the drive wheel cannot be disconnected.

4. The energy management control device as recited in claim 3, wherein
the energy management controller uses the battery capacity condition, in which generated electrical power that is generated by the electric motor during travel is made to be at a higher output than the generated electrical power in the normal state, at a time of the first fixed failure mode.

5. The energy management control device as recited in claim 1, wherein
the electric motor includes a first electric motor and a second electric motor, and
the energy management controller carries out an EV start using the second electric motor, instead of an EV start using the first electric motor, when the failure of the engagement clutches is a second fixed failure mode in which the first electric motor and the drive wheel cannot be connected.

6. The energy management control device as recited in claim 5, wherein
the second electric motor is an electric motor having a smaller electrical power generation capability than the first electric motor, and
the energy management controller carries out power generation during travel by the second electric motor, and carries out idle power generation by the first electric motor while stopping, at a time of the second fixed failure mode.

7. The energy management control device as recited in claim 2, wherein
the energy management controller sets a mode switch vehicle speed, at which to switch to an HEV mode where the internal combustion engine is added to the power source, to be slower than a normal state after an EV start by the electric motor, when the failure of the engagement clutches is a first fixed failure mode in which the internal combustion engine and the drive wheel cannot be disconnected.

8. The energy management control device as recited in claim 7, wherein
the energy management controller uses the battery capacity condition, in which generated electrical power that is generated by the electric motor during travel is made to be at a higher output than the generated electrical power in the normal state, at a time of the first fixed failure mode.

9. The energy management control device as recited in claim 2, wherein
the electric motor includes a first electric motor and a second electric motor, and
the energy management controller carries out an EV start using the second electric motor, instead of an EV start using the first electric motor, when the failure of the engagement clutches is a second fixed failure mode in which the first electric motor and the drive wheel cannot be connected.

10. The energy management control device as recited in claim 9, wherein the second electric motor is an electric motor having a smaller electrical power generation capability than the first electric motor, and the energy management controller carries out power generation during travel by the second electric motor, and carries out idle power generation by the first electric motor while stopping, at a time of the second fixed failure mode.

11. The energy management control device as recited in claim 3, wherein the electric motor includes a first electric motor and a second electric motor, and the energy management controller carries out an EV start using the second electric motor, instead of an EV start using the first electric motor, when the failure of the engagement clutches is a second fixed failure mode in which the first electric motor and the drive wheel cannot be connected.

12. The energy management control device as recited in claim 11, wherein the second electric motor is an electric motor having a smaller electrical power generation capability than the first electric motor, and the energy management controller carries out power generation during travel by the second electric motor, and carries out idle power generation by the first electric motor while stopping, at a time of the second fixed failure mode.

13. The energy management control device as recited in claim 4, wherein the electric motor includes a first electric motor and a second electric motor, and the energy management controller carries out an EV start using the second electric motor, instead of an EV start using the first electric motor, when the failure of the engagement clutches is a second fixed failure mode in which the first electric motor and the drive wheel cannot be connected.

14. The energy management control device as recited in claim 13, wherein the second electric motor is an electric motor having a smaller electrical power generation capability than the first electric motor, and the energy management controller carries out power generation during travel by the second electric motor, and carries out idle power generation by the first electric motor while stopping, at a time of the second fixed failure mode.

* * * * *